United States Patent
Kobayashi et al.

(10) Patent No.: US 10,762,257 B2
(45) Date of Patent: Sep. 1, 2020

(54) EQUIVALENT CIRCUIT CONSTRUCTION METHOD, SIMULATION METHOD AND SIMULATION DEVICE

(71) Applicant: TAIYO YUDEN CO., LTD., Tokyo (JP)

(72) Inventors: Hiroyoshi Kobayashi, Tokyo (JP); Shin Itakura, Tokyo (JP); Azusa Tomita, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 81 days.

(21) Appl. No.: 15/913,096

(22) Filed: Mar. 6, 2018

(65) Prior Publication Data

US 2018/0276328 A1    Sep. 27, 2018

(30) Foreign Application Priority Data

Mar. 23, 2017  (JP) .................... 2017-057382

(51) Int. Cl.
*G06F 30/30* (2020.01)
*G06F 30/36* (2020.01)
(Continued)

(52) U.S. Cl.
CPC .............. *G06F 30/30* (2020.01); *G06F 30/36* (2020.01); *G06F 30/367* (2020.01); *G06F 2111/10* (2020.01); *G06F 2111/20* (2020.01)

(58) Field of Classification Search
CPC ............ G06F 17/5036; G06F 17/5045; G06F 2217/02; G06F 2217/16; G06F 3/044;
(Continued)

(56) References Cited

U.S. PATENT DOCUMENTS 4,000,410 A * 12/1976 Hentschel ................ H02H 6/00
                                                361/31
5,455,582 A * 10/1995 Valdenaire ............ H03M 1/785
                                                341/144
(Continued)

FOREIGN PATENT DOCUMENTS

JP          11-312187 A      11/1999

*Primary Examiner* — Helen Rossoshek
(74) *Attorney, Agent, or Firm* — Pillsbury Winthrop Shaw Pittman, LLP

(57) ABSTRACT

An equivalent circuit is capable of, while having a simple configuration, accurately expressing a superposition characteristic and having excellent practicality and workability. A current sensor and a voltage source are connected in series between external terminals of an equivalent circuit. A reference state element having an impedance forms a closed loop with a current source. A current flowing through the equivalent circuit and detected by the current sensor is reproduced by the current source and then applied to the reference state element, so that a potential difference is generated across the reference state element. A voltage obtained by multiplying the potential difference by a correction coefficient is outputted by the voltage source. By setting the correction coefficient to be dependent on the current or an inter-terminal voltage, the impedance represented by the equivalent circuit can be reproduced as a characteristic dependent on the current I or the inter-terminal voltage.

8 Claims, 28 Drawing Sheets

(51) Int. Cl.
*G06F 30/367* (2020.01)
*G06F 111/10* (2020.01)
*G06F 111/20* (2020.01)

(58) Field of Classification Search
CPC .. G06F 17/5009; G06F 17/5022; G06F 30/30; G06F 30/36; G06F 30/367
See application file for complete search history.

(56) References Cited

U.S. PATENT DOCUMENTS

| | | | | |
|---|---|---|---|---|
| 5,663,890 A * | 9/1997 | Saleh | ................ | G06F 17/5036 327/551 |
| 6,724,201 B2 * | 4/2004 | Sato | ................ | G01F 23/363 324/699 |
| 6,842,727 B1 * | 1/2005 | Hayashi | ................ | G06F 17/5036 345/440 |
| 6,937,971 B1 * | 8/2005 | Smith | ................ | G06F 17/5036 703/18 |
| 7,353,157 B2 * | 4/2008 | Wasynczuk | ................ | G06F 17/5036 703/13 |
| 7,466,111 B2 * | 12/2008 | Komaki | ................ | H02M 3/1588 323/224 |
| 7,969,754 B2 * | 6/2011 | Radecker | ................ | H02M 3/33507 323/244 |
| 8,005,374 B2 * | 8/2011 | Yonenaga | ................ | H04B 10/5051 398/208 |
| 8,766,576 B2 * | 7/2014 | Christmann | ................ | H02P 29/0241 318/400.21 |
| 8,829,723 B2 * | 9/2014 | Graovac | ................ | H02M 7/79 307/82 |
| 9,935,452 B2 * | 4/2018 | Looby | ................ | H02H 3/044 |
| 10,084,407 B2 * | 9/2018 | Looby | ................ | H02P 6/12 |
| 10,521,533 B2 * | 12/2019 | Hidaka | ................ | G06F 17/10 |
| 2007/0182420 A1 * | 8/2007 | Buda | ................ | B23K 11/241 324/522 |
| 2010/0017186 A1 * | 1/2010 | Kim | ................ | G06F 17/5036 703/14 |
| 2014/0309979 A1 * | 10/2014 | Fu | ................ | H03H 17/02 703/13 |
| 2016/0063159 A1 * | 3/2016 | Hidaka | ................ | G06F 17/10 703/2 |
| 2016/0070837 A1 * | 3/2016 | Hidaka | ................ | G06F 17/5036 703/2 |
| 2016/0146871 A1 * | 5/2016 | Saito | ................ | G01R 27/2605 324/679 |
| 2016/0359335 A1 * | 12/2016 | Corum | ................ | H02J 5/005 |
| 2018/0096088 A1 * | 4/2018 | Itakura | ................ | G06F 17/5036 |

\* cited by examiner

EQUIVALENT CIRCUIT CONSTRUCTION METHOD, SIMULATION METHOD AND SIMULATION DEVICE

CROSS-REFERENCE TO RELATED APPLICATIONS

This application is based on and claims the benefit of priority from Japanese Patent Application Serial No. 2017-057382 (filed on Mar. 23, 2017), the contents of which are hereby incorporated by reference in their entirety.

TECHNICAL FIELD

The present invention relates to a method for constructing an equivalent circuit for various types of circuit elements such as a coil element, which is used in a simulator or the like, a simulation method and a simulation device using the equivalent circuit thus constructed, and relates particularly to a method for constructing a voltage/current-dependent equivalent circuit suitable in a case where a current or a voltage is applied in a superposed manner to an element under any bias condition (hereinafter, referred to as a "reference state element"), a simulation method and a simulation device using the equivalent circuit.

BACKGROUND

A circuit element such as, for example, a coil element (an inductor) has a frequency characteristic attributable to its material and structure, which deviates from an ideal inductor characteristic. Because of this, in order to accurately calculate a characteristic of a coil element by using a simulator or the like, an equivalent circuit model designed to exhibit an actually measured frequency characteristic of the coil element is required and thus has been provided from various vendors of coil elements.

In recent years, however, with increasing miniaturization and accuracy of electric circuit products, also with respect to coil elements, there is a growing need for a model thereof further increased in accuracy. For example, Japanese Patent Application Publication No. Hei 11-312187 (the '187 Publication) discloses a highly accurate equivalent circuit capable of successfully exhibiting characteristics of a coil element using a ferrite material. In more detail, as shown in FIG. 12A, there is used a circuit configuration in which a closed circuit composed of a resistance Rm1 and an inductance Lm1 and a closed circuit composed of a resistance Rm2 and an inductance Lm2 are magnetically coupled to an inductance Ls of a LsCpRp parallel circuit at coupling coefficients k1 and k2, respectively. FIG. 12B shows an equivalent circuit expressing a mutual inductance of the circuit configuration shown in FIG. 12A as a coil element. By using such an equivalent circuit, a frequency characteristic of a coil element is reproduced with high accuracy.

However, even the above-mentioned equivalent circuit model according to the background art has presented a problem that a characteristic is not necessarily successfully reproduced in simulation depending on a current or a voltage applied thereto.

FIGS. 13A and 13B each show a comparison between a result of an actual measurement with respect to the equivalent circuit model shown in FIG. 12B performed by using an impedance analyzer and a result of a simulation thereof. FIG. 13A shows a frequency characteristic of an inductance L of a coil element in a case where a minute alternating current of any magnitude is applied thereto. In the figure, a solid line indicates an actual measurement result, and a broken line indicates a simulation result. As shown in this graph, the actual measurement result and the simulation result agree extremely well with each other.

In contrast to this, FIG. 13B shows a result of an actual measurement of the inductance L at a particular frequency in a case where a current is further superposed on the minute current in FIG. 13A and a result of a simulation thereof. As shown in this figure, a simulation value indicated by a broken line does not agree with an actual measurement value indicated by a solid line, and a disparity therebetween increases with increasing amount of the current thus superposed. As described above, accuracy of a simulation decreases with increasing current condition.

FIG. 14B shows a result of a comparison between an actual measurement value and a simulation value of an inductor current IL in a DC-DC converter as shown in FIG. 14A. The DC-DC converter is composed of MOSFETs Qp and Qn, a gate driver GD, a coil element Ld, and a capacitor Cd and uses the above-mentioned equivalent circuit according to the background art as an equivalent circuit for the coil element Ld. In FIG. 14B, a solid line indicates an actual measurement result, and a broken line indicates a simulation result. As is apparent from a comparison between the lines in this graph, an influence of a change in characteristic caused by a current increase or current superposition has not been able to be successfully reproduced on an equivalent circuit model, so that a difference is seen between an actual measurement waveform and a simulation waveform. As described above, according to the background art, sufficient accuracy cannot be obtained also in a transient analysis in which a load current changes on a time axis.

SUMMARY

In view of the above-described circumstances, an object of the present invention is to provide a method for constructing an equivalent circuit capable of, while having a simple configuration, accurately expressing a characteristic at a time when a current or a voltage is successfully superposed and having excellent practicality and workability, a simulation method and a simulation device using the equivalent circuit.

A method for constructing a superposition equivalent circuit according to the present invention is a method for constructing a superposition equivalent circuit for a passive element in a superposition state where a current or a voltage is superposed, the superposition equivalent circuit being constructed by utilizing a reference state equivalent circuit for the passive element in a reference state where the current or voltage is not superposed. The method is characterized by including a step of supplying a current or a voltage corresponding to a difference between a non-superposition characteristic of the passive element in the reference state and a superposition characteristic of the passive element in the superposition state, thus performing a correction of the difference.

In one of main aspects, a voltage source and a current sensor are connected between external terminals of the superposition equivalent circuit the reference state equivalent circuit, a current source, and a voltage sensor are connected to an independent closed loop circuit not connected between the external terminals of the superposition equivalent circuit and the step of performing the correction includes: detecting a current between the external terminals by use of the current sensor, passing a current dependent on a result of the detection from the current source through the reference state equivalent circuit, detecting a voltage generated in the reference state equivalent circuit by passing the current by use of the voltage sensor, and outputting a voltage dependent on a result of the detection from the voltage source.

More specifically, a first arithmetic operation is performed based on the result of detecting the current between the external terminals, and a current obtained by the first arithmetic operation is output from the current source to the reference state equivalent circuit second arithmetic operation is performed based on the result of detecting the voltage generated in the reference state equivalent circuit and a voltage obtained by the second arithmetic operation is output from the voltage source to between the external terminals; and the correction of the difference between the characteristic of the superposition equivalent circuit and the characteristic of the reference state equivalent circuit is performed by at least one of the first and second arithmetic operations. Moreover, the method is characterized in that the first or second arithmetic operation used to perform the correction of a difference in characteristic is a multiplication or a division.

In another one of the main aspects, a current source and a voltage sensor are connected between external terminals of the superposition equivalent circuit the reference state equivalent circuit, a voltage source, and a current sensor are to an independent closed loop circuit not connected between the external terminals of the superposition equivalent circuit and the step of performing the correction includes: detecting a voltage between the external terminals by use of the voltage sensor, passing a voltage dependent on a result of the detection from the voltage source through the reference state equivalent circuit, detecting a current generated in the reference state equivalent circuit by passing the voltage by use of the current sensor, and outputting a current dependent on a result of the detection from the current source.

More specifically, a third arithmetic operation is performed based on the result of detecting the voltage between the external terminals, and a voltage obtained by the third arithmetic operation is output from the voltage source to the reference state equivalent circuit a fourth arithmetic operation is performed based on the result of detecting the current generated in the reference state equivalent circuit, and a current obtained by the fourth arithmetic operation is output from the current source to between the external terminals; and the correction of the difference between the characteristic of the superposition equivalent circuit and the characteristic of the reference state equivalent circuit is performed by at least one of the third and fourth arithmetic operations. Moreover, the method is characterized in that the third or fourth arithmetic operation used to perform the correction of the difference in characteristic is a multiplication or a division.

In still another one of the main aspects, the reference state equivalent circuit and a current sensor are connected between external terminals of the superposition equivalent circuit, and a current source is connected in parallel to the reference state equivalent circuit and the step of performing the correction includes: detecting a current between the external terminals by use of the current sensor, and outputting a current dependent on a result of the detection from the current source. More specifically, a fifth arithmetic operation is performed based on the result of the detection by the current sensor, and a current obtained by the fifth arithmetic operation is output from the current source; and the correction of the difference between the characteristic of the superposition equivalent circuit and the characteristic of the reference state equivalent circuit is performed by the fifth arithmetic operation. Moreover, the method is characterized in that the fifth arithmetic operation used to perform the correction of the difference in characteristic is an addition or a subtraction.

A simulation method using a superposition equivalent circuit according to the present invention is characterized by including a step of calculating a characteristic of an electronic circuit by utilizing a superposition equivalent circuit constructed by any one of the above-described construction methods, the electronic circuit including a passive element represented by said superposition equivalent circuit. A simulation device using a superposition equivalent circuit according to the present invention is characterized in that a superposition equivalent circuit constructed by any one of the above-described construction methods is connected in place of a passive element included in a circuit to be simulated, and an arithmetic operation for determining a characteristic of the circuit to be simulated is performed. The above-described and other objects, features, and advantages of the present invention will be apparent from the following detailed description and attached drawings.

Advantages

According to the present invention, an equivalent circuit in a reference state is used as a reference, and a power source circuit that exhibits a change in characteristic at a time of current or voltage superposition is added to the equivalent circuit. Thus, a passive element at a time of current or voltage superposition can be expressed by using a simply configured equivalent circuit, and it becomes possible to accurately express a characteristic at a time of current or voltage superposition. Consequently, with respect to various types of circuits each using a passive element expressed by the equivalent circuit, a simulation at a time of current or voltage superposition can be accurately performed, and thus practicality and workability in circuit designing can be improved.

DESCRIPTION OF THE PREFERRED EMBODIMENTS

Hereinafter, best modes for carrying out the present invention will be described in detail by way of working examples.

Example 1

Figure 1A:
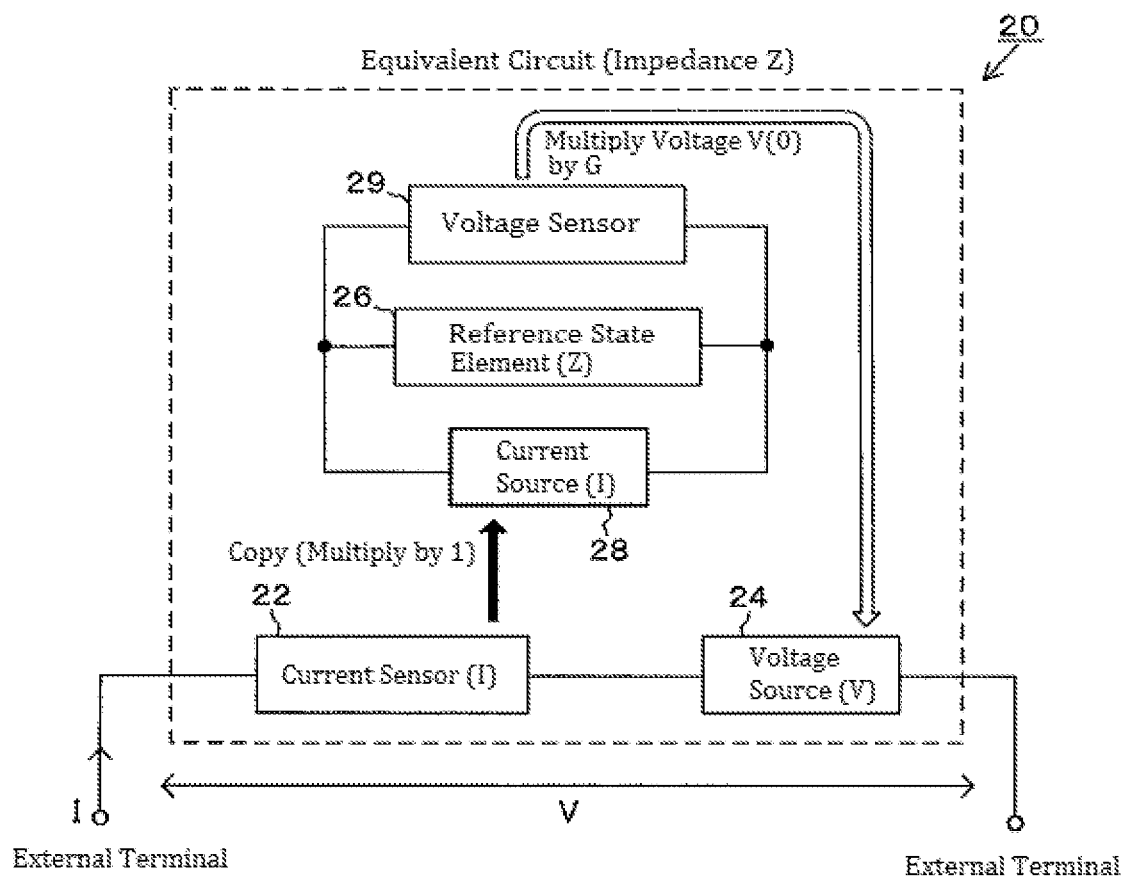
FIG. 1A is a block diagram showing a basic configuration of an equivalent circuit of Example 1 according to the present invention.
Figure 1B:
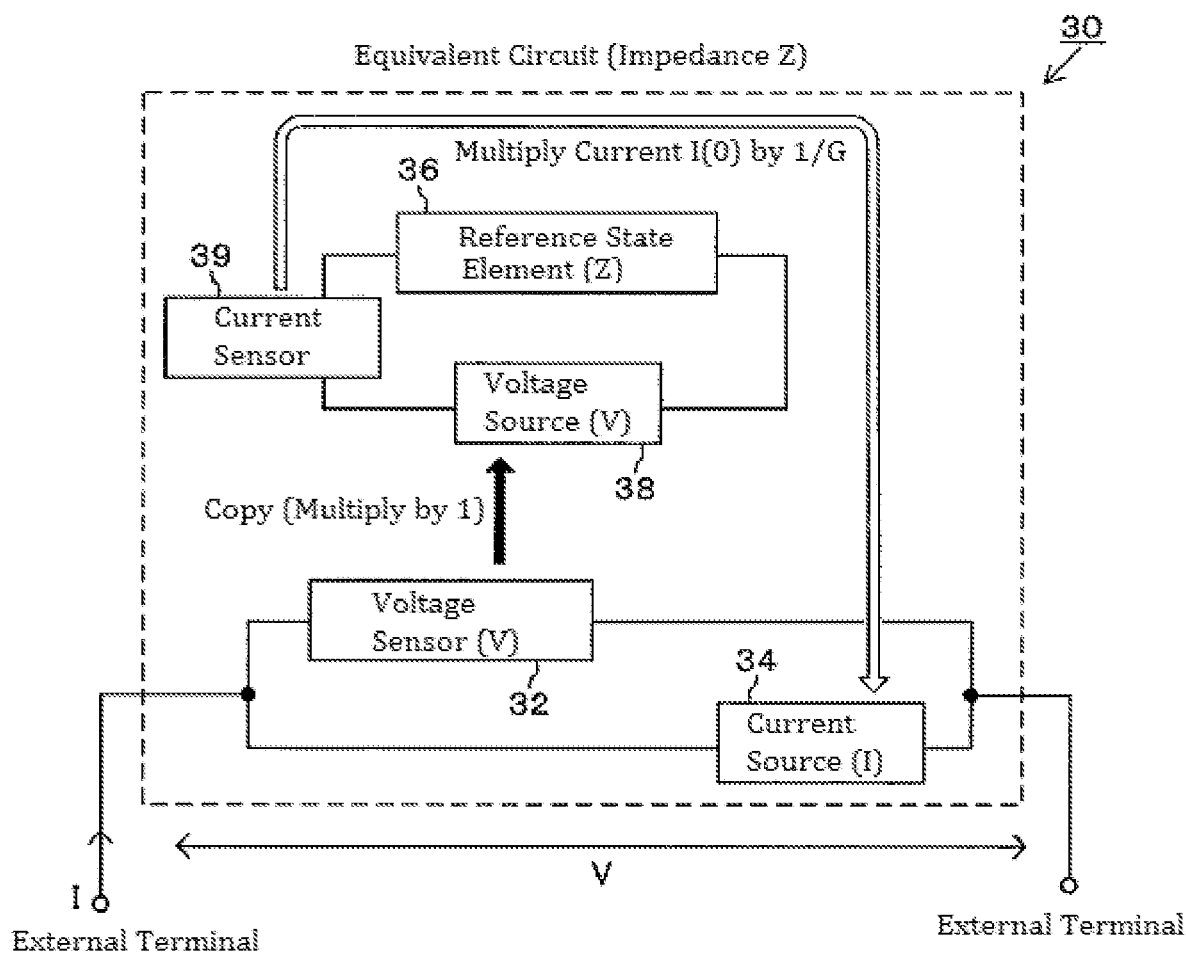
FIG. 1B is a block diagram showing a basic configuration of an equivalent circuit of Example 2 according to the present invention.

First, with reference to FIG. 1A and FIGS. 2A to 2C, a description is given of Example 1. The present invention provides a method in which a current sensor or a voltage sensor is utilized, and a current value or a voltage value detected thereby is multiplied by a coefficient. In the method, either of a voltage source and a current source is applicable as a power source connected in series to the current sensor or the voltage sensor, and how these sensors and the power sources are combined depends on a type of the sensor used. FIG. 1A shows, as Example 1, an example of an equivalent circuit in which a current sensor and a voltage source are combined, and FIG. 1B shows, as Example 2, an example of an equivalent circuit in which a voltage sensor and a current source are combined. First, a description is given of Example 1 shown in FIG. 1A.

In FIG. 1A, a current sensor 22 and a voltage source 24 are connected in series between external terminals of an equivalent circuit 20. A reference state element (a reference state equivalent circuit) 26 having an impedance Z forms a closed loop with a current source 28. The reference state element 26 is an equivalent circuit for an impedance element that exhibits a characteristic at a time when a bias of any magnitude (a minute alternating current for measurement) is applied, and an equivalent circuit exhibiting a characteristic in a vicinity of IL of "0" shown in a graph of FIG. 13B corresponds thereto. Alternatively, it may also be said that an equivalent circuit exhibiting a characteristic in a current range in which a dotted line and a solid line in the graph of FIG. 13B coincide with each other corresponds to the reference state element 26. A voltage sensor 29 that detects a potential difference V(0) across the reference state element 26 is connected in parallel to the reference state element 26. A current I flowing through the equivalent circuit 20 is detected by the current sensor 22, and the detected current I is reproduced by the current source 28 of a closed loop circuit and then applied to the reference state element 26. The current I turns into a sum of a minute current flowing in a reference state and a current superposed thereon. At this time, the potential difference V(0) is generated across the reference state element 26 and detected by the voltage sensor 29. A voltage obtained by multiplying the potential difference V(0) by a correction coefficient G is fed back to the voltage source 24 and outputted by the voltage source 24 connected in series to the current sensor 22.

With respect to the impedance Z of the reference state element 26, a voltage V between the external terminals of the equivalent circuit 20 is apparently expressed by a mathematical expression 1 below, thus being equivalent to a case where the impedance Z is multiplied by G (a multiplication). The voltage V can also be regarded as the impedance Z divided by 1/G.

$$V = V(0) \times G = Z \times I \times G \qquad \text{[Mathematical Expression 1]}$$

Herein, by imparting a function characteristic dependent on the current I or the inter-terminal voltage V to the correction coefficient G so that a correction coefficient G(I) or G(V) is obtained, it becomes possible to reproduce an impedance of the equivalent circuit 20 as a whole (an impedance between the external terminals) as a characteristic dependent on the current I or the inter-terminal voltage V.

While in the above description, the current I detected by the current sensor 22 is copied (multiplied by 1) and used as it is as the current I of the current source 28, it may also be possible that a current of the current source 28 is multiplied by G and the potential difference V(0) in a reference state is multiplied by 1. Alternatively, it may also be possible that a current of the current source 28 is multiplied by ka and the potential difference V(0) in a reference state is multiplied by kb so that a multiplication by G=ka×kb is achieved as a whole. In this case, at least one of the coefficients ka and kb is set to be dependent on the current I or the inter-terminal voltage V.

Figure 2A:
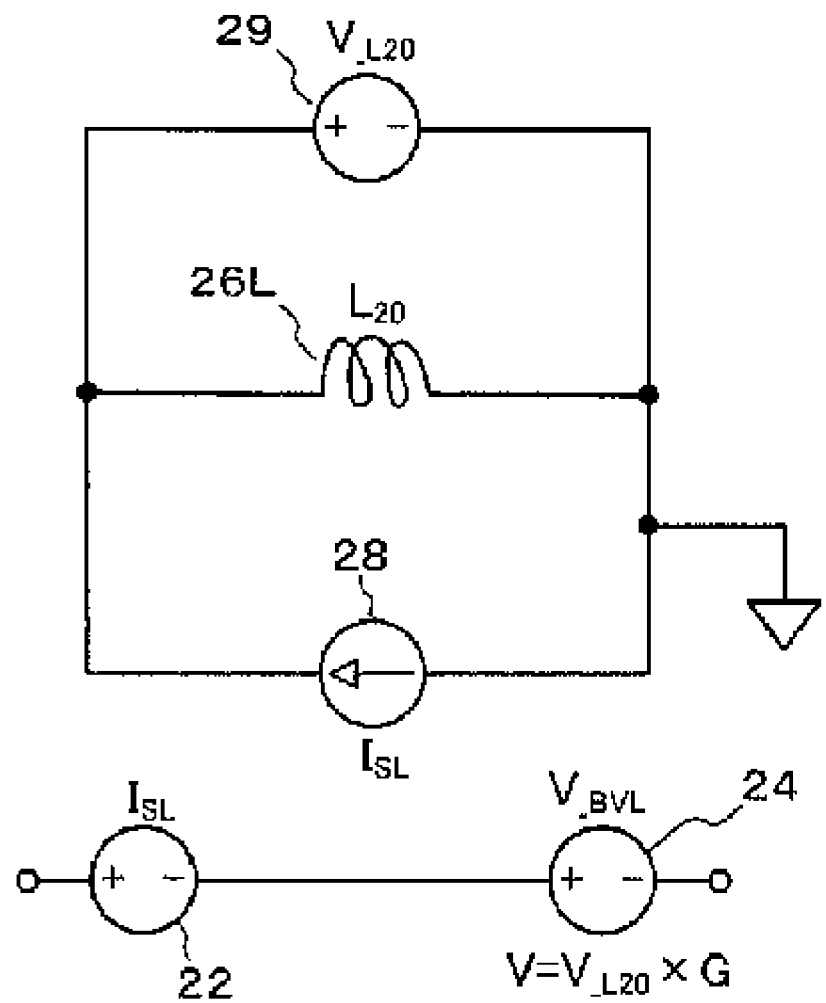
FIG. 2A is a circuit diagram showing an application example of Example 1.
Figure 2B:
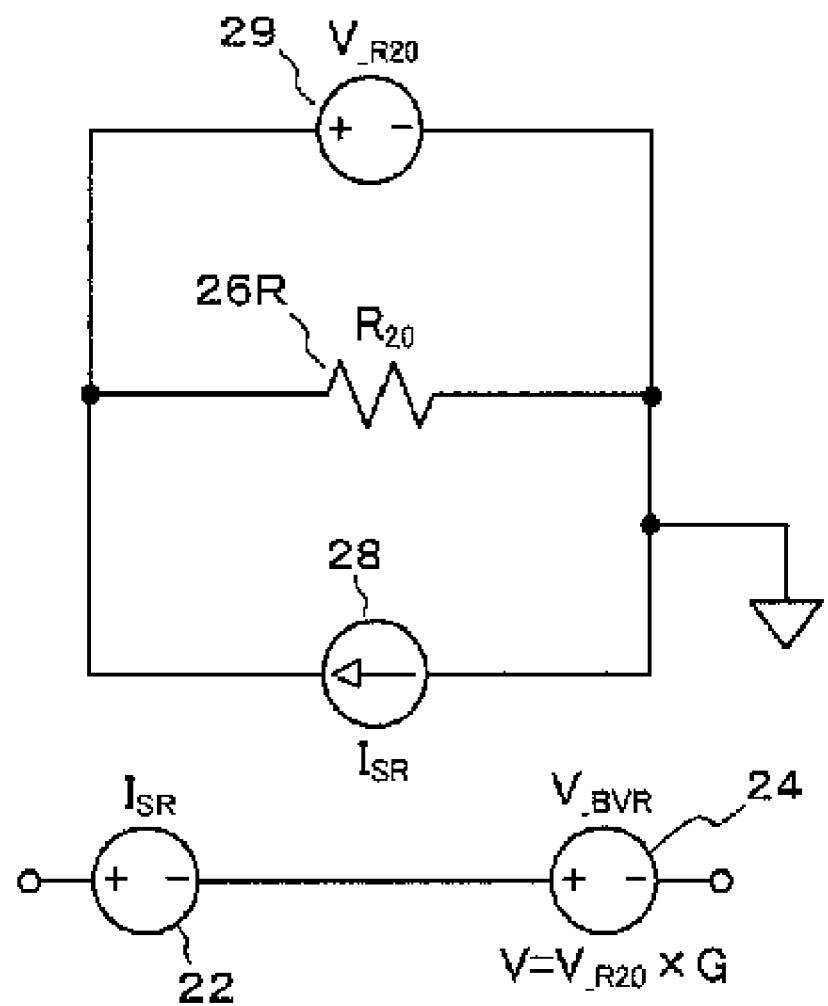
FIG. 2B is a circuit diagram showing an application example of Example 1.
Figure 2C:
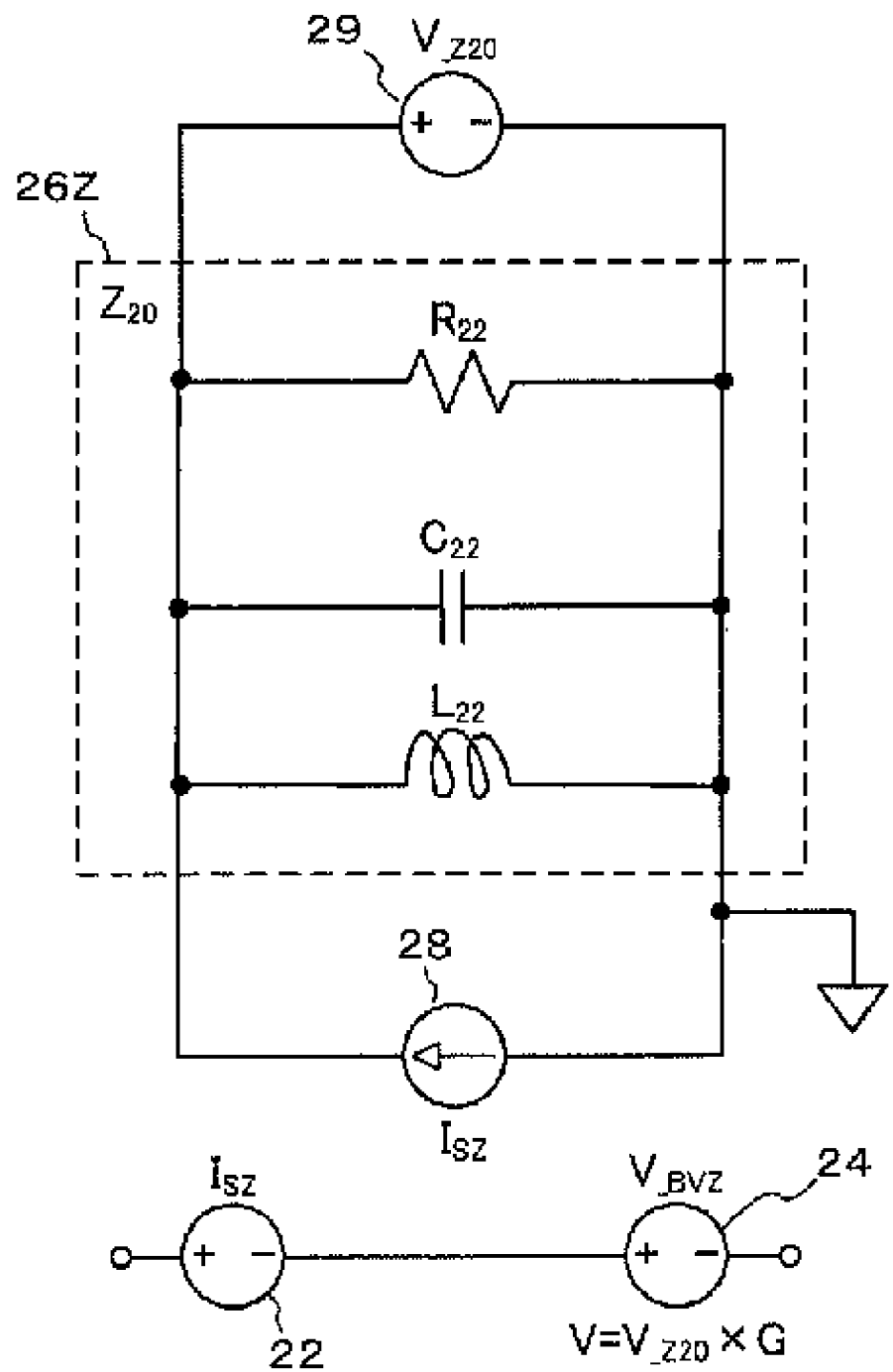
FIG. 2C is a circuit diagram showing an application example of Example 1.

FIGS. 2A to 2C show specific equivalent circuit examples in a case where the equivalent circuit shown in FIG. 1A is used in an actual circuit simulator. Among these examples, the one shown in FIG. 2A is an example of a case where a reference state coil element 26L is used as the reference state element 26. The current sensor 22 is represented as a voltage source, and a voltage across the voltage source is set to 0 [V]. Where a current of the current source 28 (a current detected by the current sensor 22) is denoted as ISL, an inductance of the reference state coil element 26L is denoted as L20, and an element voltage of the reference state coil element 26L at a time when the current ISL flows therethrough is denoted as V_L20, a voltage obtained by multiplying the element voltage V_L20 by G is outputted from the voltage source 24. Accordingly, an output voltage V_BVL of the voltage source 24 is expressed by a mathematical expression 2 below. In this mathematical expression, "j" denotes an imaginary unit, and "ω" denotes an angular frequency.

$$V_{\_BVL}=V_{\_L20}\times G=Is\times j\omega L_{20}\times G \quad \text{[Mathematical Expression 2]}$$

As described above, according to this example, when seen from external terminals of an equivalent circuit, the inductance L20 of the reference state coil element 26L is apparently multiplied by G. Accordingly, by imparting a relationship dependent on the current ISL detected by the current sensor 22 to the correction coefficient G, it becomes possible to reproduce a current dependency of a coil element at a time of current superposition.

Next, FIG. 2B shows an example of a case where a reference state resistance element 26R is used as the reference state element 26. Where a current of the current source 28 (a current detected by the current sensor 22) is denoted as ISR, a resistance value of the reference state resistance element 26R is denoted as R20, and an element voltage of the reference state resistance element 26R at a time when the current ISR flows therethrough is denoted as V_R20, a voltage obtained by multiplying the element voltage V_R20 by G is outputted from the voltage source 24. Accordingly, an output voltage V_BVR of the voltage source 24 is expressed by a mathematical expression 3 below.

$$V_{\_BVR}=V_{\_R20}\times G=Is\times R_{20}\times G \quad \text{[Mathematical Expression 3]}$$

As described above, according to this example, when seen from external terminals of an equivalent circuit, the resistance value R20 of the reference state resistance element 26R is apparently multiplied by G. Accordingly, by imparting a relationship dependent on the current ISR detected by the current sensor 22 to the correction coefficient G, it becomes possible to reproduce a current dependency of a resistance element at a time of current superposition.

Next, FIG. 2C shows an example of a case where a reference state impedance element 26Z is used as the reference state element 26. While the reference state impedance element 26Z in the example shown in this figure has a configuration in which a reference state resistance element having a resistance value R22, a reference state coil element having an inductance L22, and a reference state capacitor element having a capacitance C22 are connected in parallel to each other, various configurations may be adopted. Where a current of the current source 28 is denoted as ISZ, a resistance value of the reference state impedance element 26Z is denoted as Z20, and an element voltage of the reference state impedance element 26Z at a time when the current ISZ flows therethrough is denoted as V_Z20, a voltage obtained by multiplying the element voltage V_Z20 by G is outputted from the voltage source 24. Accordingly, an output voltage V_BVZ of the voltage source 24 is expressed by a mathematical expression 4 below.

$$V_{\_BVZ}=V_{\_Z20}\times G=Is\times Z_{20}\times G \quad \text{[Mathematical Expression 4]}$$

As described above, when seen from external terminals of an equivalent circuit, the resistance value Z20 of the reference state impedance element 26Z is apparently multiplied by G. Accordingly, by imparting a relationship dependent on the current ISZ detected by the current sensor 22 to the correction coefficient G, a current dependency of an impedance element at a time of current superposition is reproduced.

As described above, according to this working example, a current sensor and a voltage source are connected in series between external terminals of an equivalent circuit, and a current source is connected in a loop to a passive element in a reference state. Further, a current value of the current source is set to be dependent on a current value detected by the current sensor, and a voltage value of the voltage source is set to be dependent on an element voltage of the passive element generated thereby, so that the following effects are obtained. (1) A difference between a characteristic of an equivalent circuit at a time of superposition and a characteristic of the equivalent circuit in a reference state is corrected, so that a characteristic of a passive element at a time of current superposition can be successfully expressed, and thus reproducibility in performing a simulation regarding a circuit characteristic is improved (2) Electronic component manufacturers and their representative trading companies provide their customers with equivalent circuits at a time of current superposition for various passive elements provided by themselves or make them public on their company websites. This can provide the customers adopting their products with convenience in circuit designing and further lead to creation of product sales opportunities. (3) Electronic equipment manufacturers and electronic circuit designing companies use the equivalent circuits at a time of current superposition thus published and thus can efficiently select electronic components optimum for a design circuit and accurately design electronic equipment, so that a designing time can be significantly reduced.

Example 2

Next, the case shown in FIG. 1B in which a voltage sensor and a current source are combined will be described as Example 2. A voltage sensor 32 and a current source 34 are connected in parallel between external terminals of an equivalent circuit 30. A reference state element 36 having an impedance Z forms a closed loop with a voltage source 38. A current sensor 39 that detects an element current I(0) is connected in series to the reference state element 36. A voltage V between external terminals of the equivalent circuit 30 is detected by the voltage sensor 32, and the detected voltage V is reproduced by the voltage source 38 of a closed loop circuit and then applied to the reference state element 36. The voltage V turns into a sum of a minute voltage in a reference state and a voltage superposed thereon. At this time, the element current I(0) flows through the reference state element 36 and is detected by the current sensor 39. A current obtained by dividing the element current I(0) by a correction coefficient G (or multiplied by "1/G") is fed back to the current source 34 and outputted by the current source 34 connected in parallel to the voltage sensor 32.

With respect to the impedance Z of the reference state element 36, the voltage V between the external terminals of the equivalent circuit 30 is apparently expressed by a mathematical expression 5 below, thus being equivalent to a case where the impedance Z is multiplied by G.

$$I = I(0) \div G = \frac{V}{Z \times G}$$ [Mathematical Expression 5]

Herein, by imparting a function characteristic dependent on the current I or the inter-terminal voltage V to the correction coefficient G so that a correction coefficient G(I) or G(V) is obtained, it becomes possible to reproduce the impedance Z of the equivalent circuit 30 as a whole as a characteristic dependent on the current I or the inter-terminal voltage V. While in the above description, the voltage V detected by the voltage sensor 32 is copied (multiplied by 1) and used as it is as the voltage V of the voltage source 38, it may also be possible that a voltage of the voltage source 38 is multiplied by 1/G and the current I(0) in a reference state is multiplied by 1. Alternatively, it may also be possible that a voltage of the voltage source 38 is multiplied by 1/kc and the current I(0) in a reference state is multiplied by 1/kd so that a multiplication by 1/G=1/(kc×kd) is achieved as a whole. In this case, at least one of the coefficients kc and kd is set to be dependent on the current I or the inter-terminal voltage V.

Figure 3A:
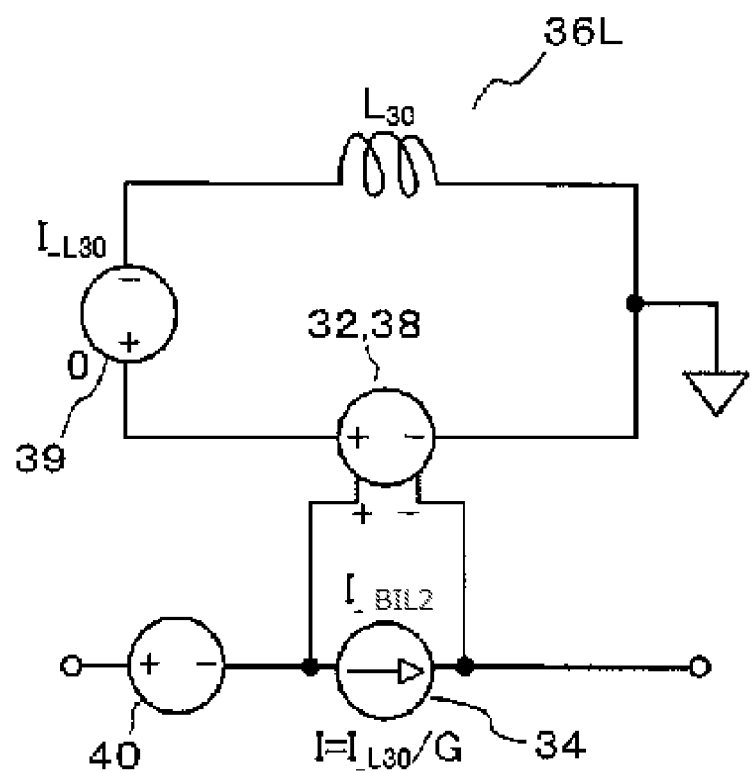
FIG. 3A is a circuit diagram showing an application example of Example 2.
Figure 3B:
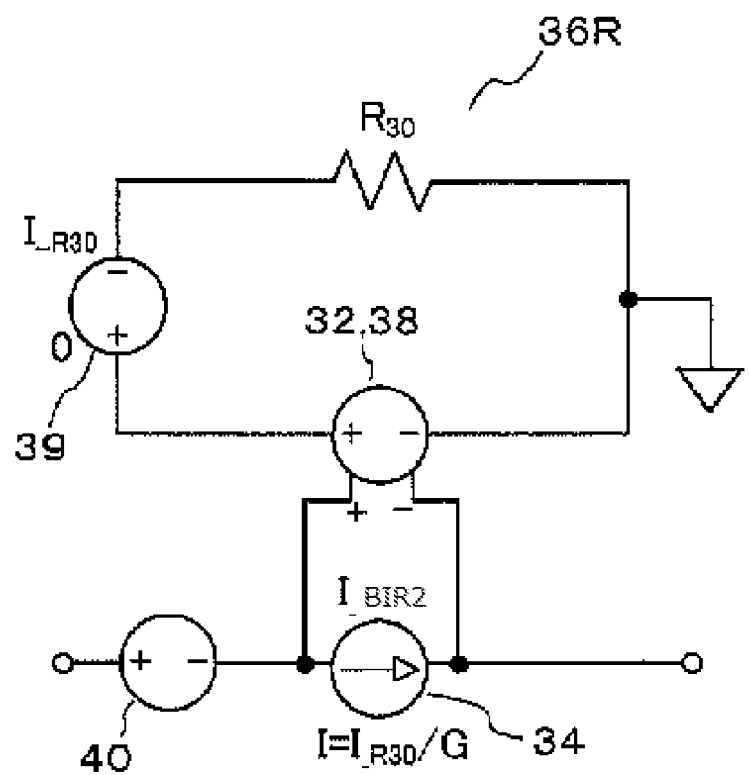
FIG. 3B is a circuit diagram showing an application example of Example 2.
Figure 3C:
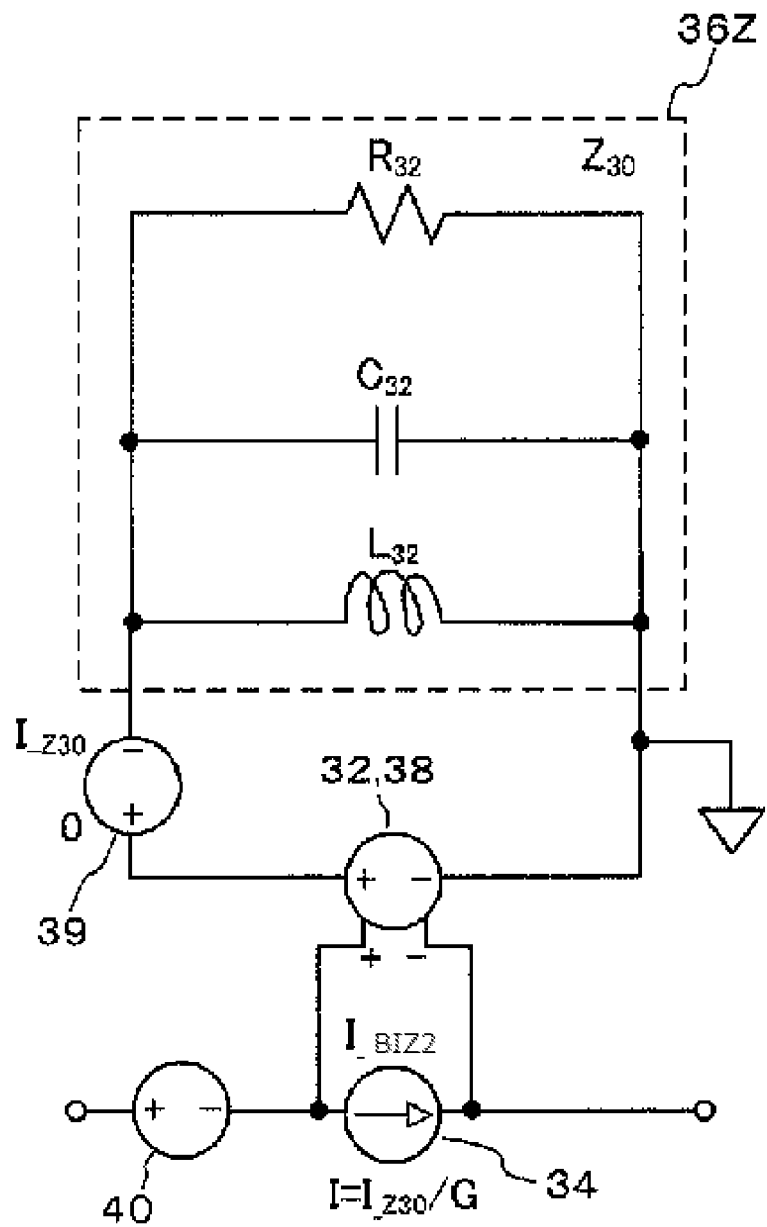
FIG. 3C is a circuit diagram showing an application example of Example 2.

FIGS. 3A to 3C show specific equivalent circuit examples in a case where the equivalent circuit shown in FIG. 1B is used in an actual circuit simulator. Among these examples, the one shown in FIG. 3A is an example of a case where a reference state coil element 36L is used as the reference state element 36. A current sensor 40 for imparting a current dependency to the coefficient G shown in FIGS. 3A to 3C is omitted in FIG. 1B. The voltage sensor 32 and the voltage source 38 are formed as one unit.

Where a voltage of the voltage source 38 (a voltage detected by the voltage sensor 32) is denoted as VSL, an inductance of the reference state coil element 36L is denoted as L30, and an element current of the reference state coil element 36L at a time when the voltage VSL is applied thereto is denoted as I_L30, a current obtained by multiplying the element current I_L30 by 1/G is outputted from the current source 34. Accordingly, an output current I_BIL2 of the current source 34 is expressed by a mathematical expression 6 below.

$$I\_BIL2 = I\_L30 \div G = \frac{V_{SL}}{J\omega L_{30} \times G}$$ [Mathematical Expression 6]

As described above, according to this example, when seen from external terminals of an equivalent circuit, the inductance L30 of the reference state coil element 36L is apparently multiplied by G. Accordingly, by imparting a relationship dependent on the current ISL detected by the current sensor 40 to the correction coefficient G, it becomes possible to reproduce a current dependency of a coil element at a time of current superposition.

FIG. 3B shows an example of a case where a reference state resistance element 36R is used as the reference state element 36. Where a voltage of the voltage source 38 (a voltage detected by the voltage sensor 32) is denoted as VSR, a resistance value of the reference state resistance element 36R is denoted as R30, and an element current of the reference state resistance element 36R at a time when the voltage VSR is applied thereto is denoted as I_R30, a current obtained by multiplying the element current I_R30 by 1/G is outputted from the current source 34. Accordingly, an output current I_BIR2 of the current source 34 is expressed by a mathematical expression 7 below.

$$I\_BIR2 = I\_R30 \div G = \frac{V_{SR}}{R_{30} \times G}$$ [Mathematical Expression 7]

As described above, according to this example, when seen from external terminals of an equivalent circuit, the resistance value R30 of the reference state resistance element 36R is apparently multiplied by G. Accordingly, by imparting a relationship dependent on the current ISR detected by the current sensor 40 to the correction coefficient G, it becomes possible to reproduce a current dependency of a resistance element at a time of current superposition.

FIG. 3C shows an example of a case where a reference state impedance element 36Z is used as the reference state element 36. While the reference state impedance element 36Z in the example shown in this figure has a configuration in which a reference state resistance element having a resistance value R32, a reference state coil element having an inductance L32, and a reference state capacitor element having a capacitance C32 are connected in parallel to each other, various configurations may be adopted. Where a voltage of the voltage source 38 (a voltage detected by the voltage sensor 32) is denoted as VSZ, an impedance of the reference state impedance element 36Z is denoted as Z30, and an element current of the reference state impedance element 36Z at a time when the voltage VSZ is applied thereto is denoted as I_Z30, a current obtained by multiplying the element current I_Z30 by 1/G is outputted from the current source 34. Accordingly, an output current I_BIZ2 of the current source 34 is expressed by a mathematical expression 8 below.

$$I\_BIZ2 = I\_Z30 \div G = \frac{V_{SZ}}{Z_{30} \times G}$$ [Mathematical Expression 8]

As described above, according to this example, when seen from external terminals of an equivalent circuit, the impedance Z30 of the reference state impedance element 36Z is apparently multiplied by G. Accordingly, by imparting a relationship dependent on the current ISZ detected by the current sensor 40 to the correction coefficient G, it becomes possible to reproduce a current dependency of an impedance element at a time of current superposition.

As described above, according to this working example, a voltage sensor and a current source are connected in parallel between external terminals of an equivalent circuit, and a voltage source is connected in a loop to a passive element in a reference state. Further, a voltage of the voltage source is set to be dependent on a voltage value detected by the voltage sensor, and a current value of the current source is set to be dependent on an element current of the passive element generated thereby, so that there can be obtained effects similar to those of the above-described working example, such as the following: a characteristic of the passive element at a time of current superposition can be successfully expressed, and thus reproducibility in performing a simulation regarding a circuit characteristic is improved.

Example 3

Figure 12A:
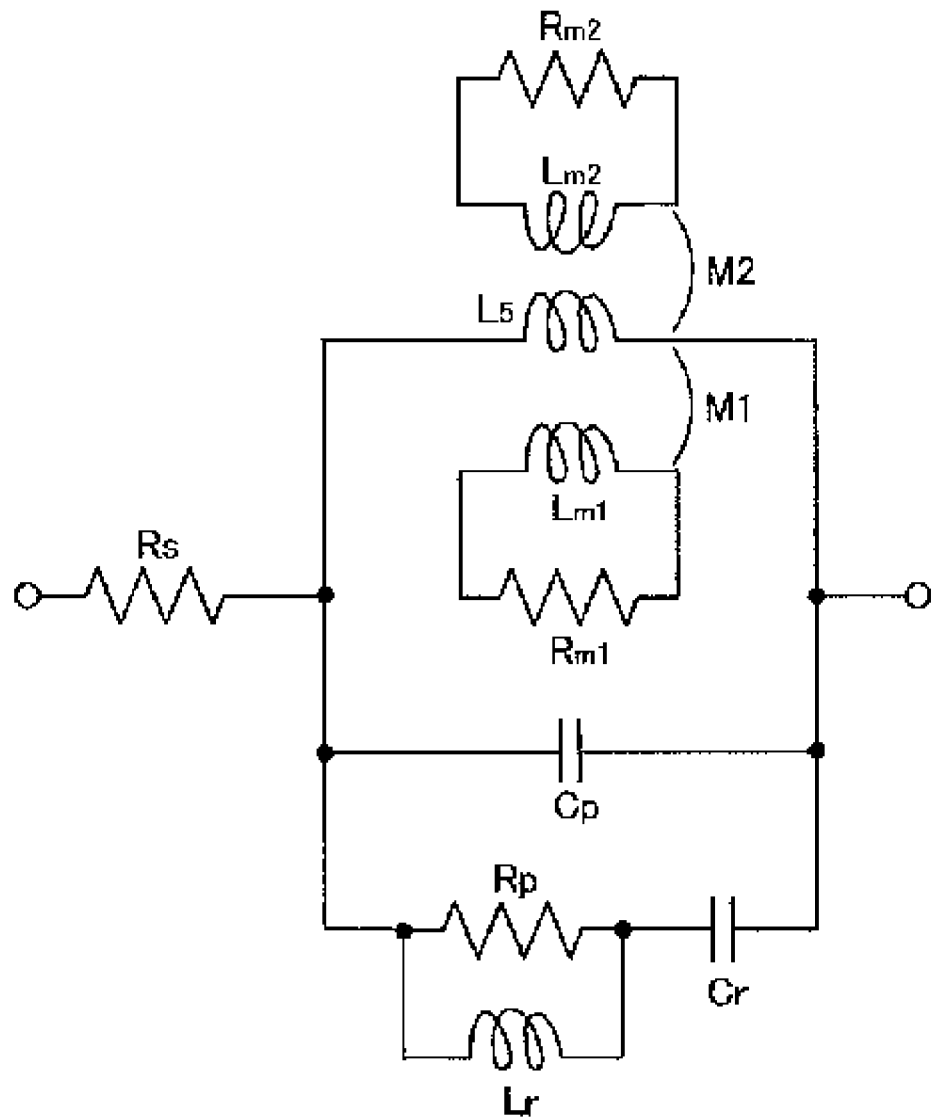
FIG. 12A is a circuit diagram showing one example of a conventional equivalent circuit.
Figure 12B:
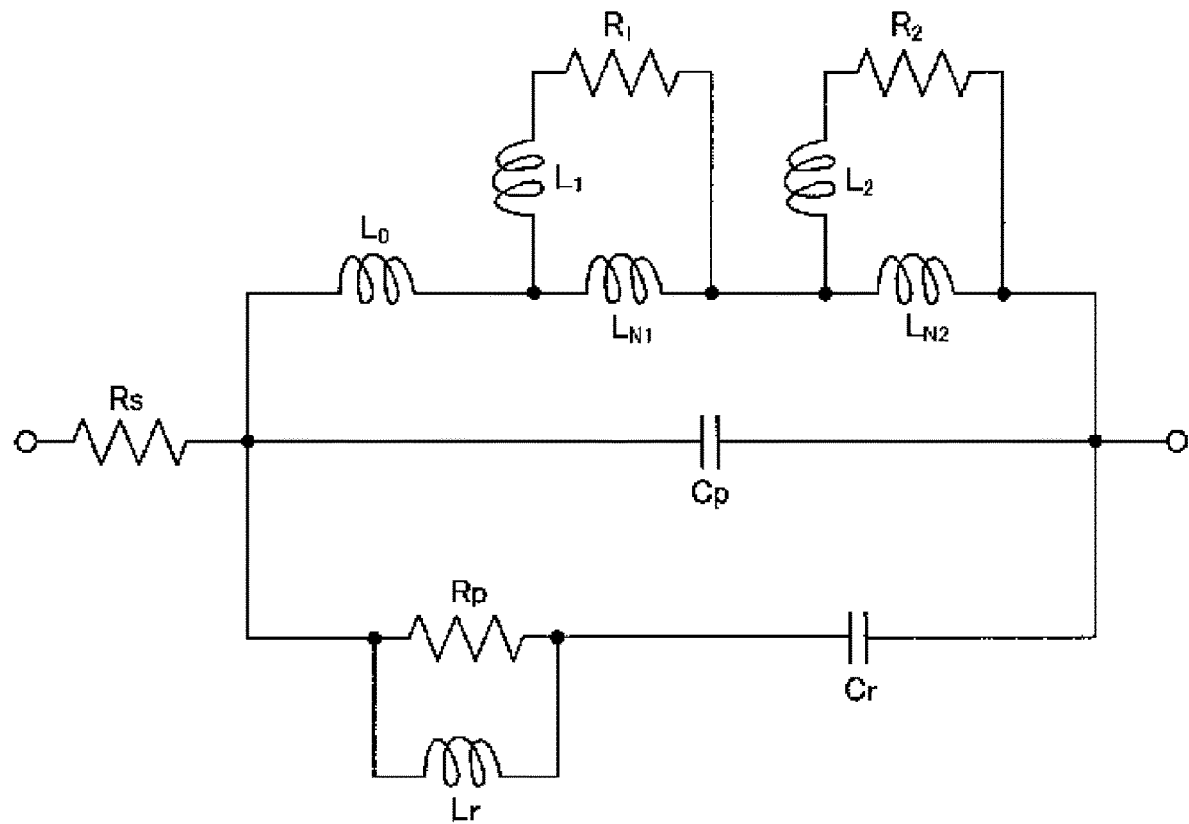
FIG. 12B is a circuit diagram showing one example of the conventional equivalent circuit.
Figure 13A:
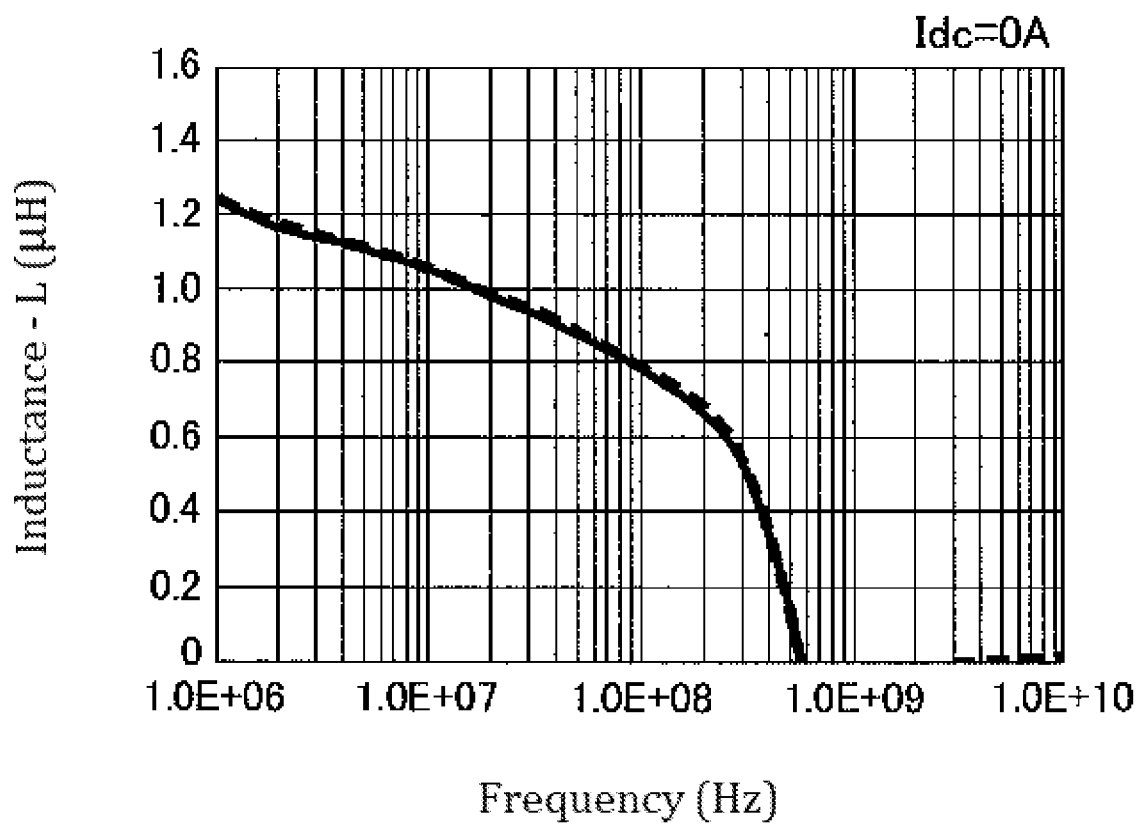
FIG. 13A is a graph showing a comparison between a result of an actual measurement of a characteristic of the equivalent circuit shown in FIG. 12B and a result of a simulation thereof.
Figure 13B:
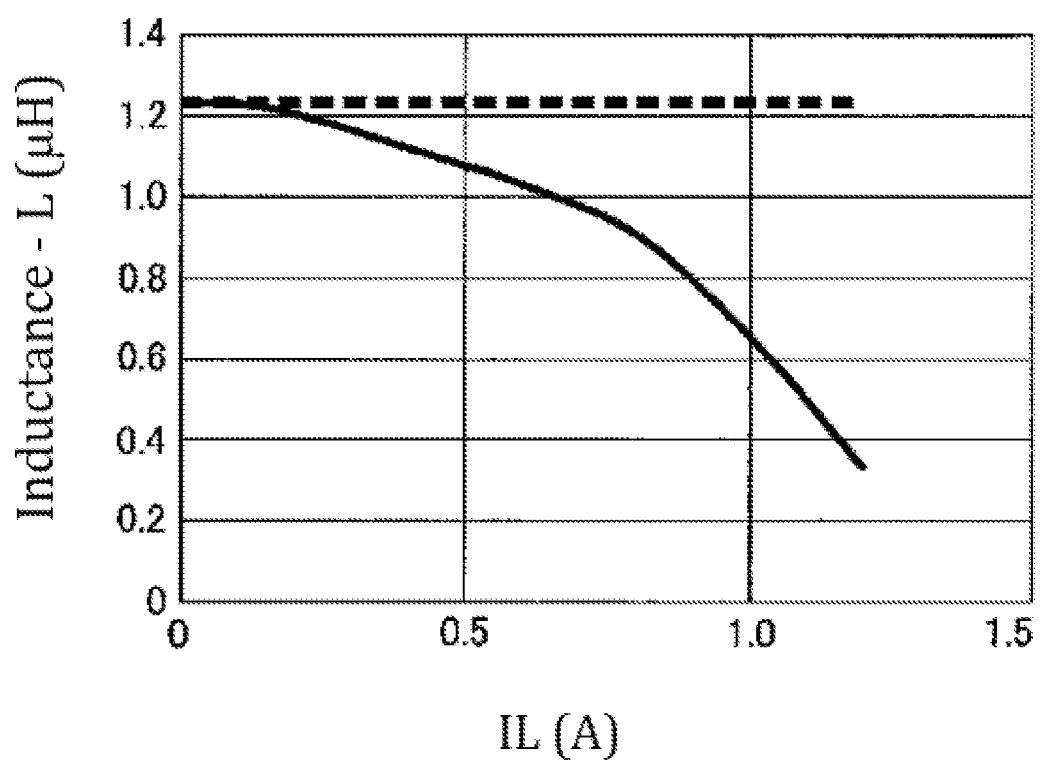
FIG. 13B is a graph showing a comparison between a result of an actual measurement of a characteristic of the equivalent circuit shown in FIG. 12B and a result of a simulation thereof.

Next, as Example 3, a technique for determining the above-mentioned coefficient G will be described. As shown in FIG. 13B mentioned above, a disparity between an actual measurement value and a simulation value of an inductance at a time of current superposition in the equivalent circuit model shown in FIG. 12B increases with increasing amount of the superposed current IL. This disparity is corrected by using the coefficient G so that the broken line indicating a simulation result coincides with the solid line indicating an actual measurement result. As a result of this, the coefficient G has a current dependency. The current dependency of the coefficient G can be reproduced as a current dependency curve obtained by normalizing an inductance value ("1.2 µH" in FIG. 13B) of actual measurement data in a reference state (IL=0) to "1". Furthermore, the superposed current IL is dependent only on a magnitude of a current flowing through a passive element regardless of a direction of the current. It is, therefore, desirable that the superposed current IL be handled as an absolute value in a function or that the function be an even function.

Figure 4:
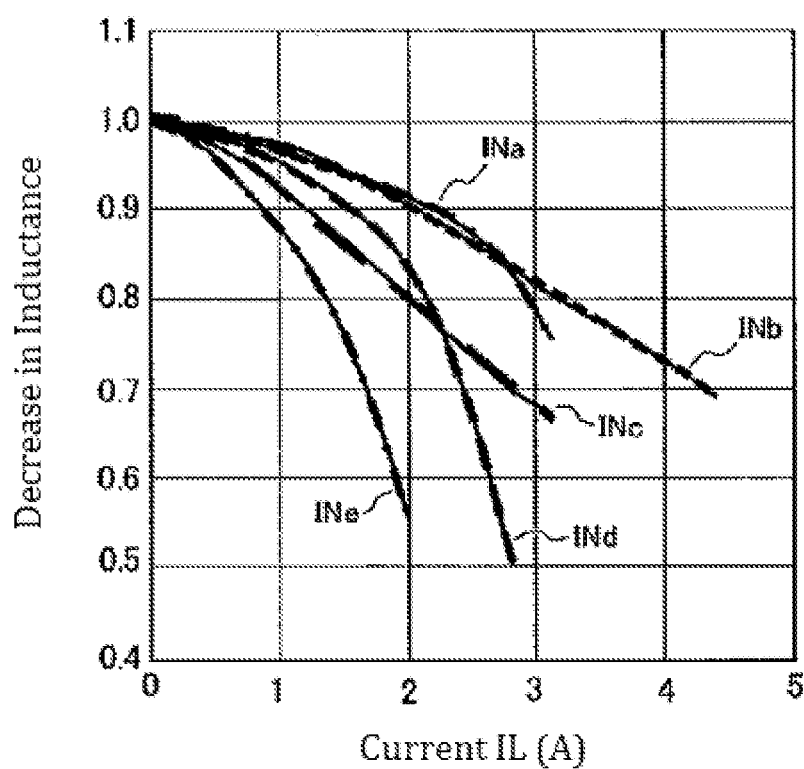
FIG. 4 is a graph showing a comparison between a result of an actual measurement of a current superposition characteristic of each of different coil elements and a result of a simulation thereof.

FIG. 4 shows current superposition characteristics INa to INe of different coil element components (coil element components different in model number). A horizontal axis indicates a superposed current IL, and a vertical axis indicates a rate of decrease in inductance relative to a case where IL=0. By using a mathematical expression 9 as a function of the coefficient G so as to satisfy the conditions of the above-mentioned equivalent circuits with respect to the current superposition characteristics of the various coil element components shown in a graph of FIG. 4, it becomes possible to reproduce a current dependency with high accuracy. Furthermore, by increasing n, it becomes possible to smoothly express a more complicated characteristic curve. In the mathematical expression 9, An and Bn (n=1, 2, 3, . . . ) are constants determined from INa to INe in the graph of FIG. 4.

[Mathematical Expression 9]

$$G(IL) = G(IL)\_1 \times G(IL)\_2 \times G(IL)\_3 \times \ldots$$

$$*n = 1, 2, 3 \ldots$$

$$G(IL)\_n = \frac{A_{\_n}^2}{\sqrt{(A_{\_n}^2 - IL^2)^2 + (2B_{\_n}A_{\_n}IL)^2}}$$

In FIG. 4, a solid line indicates an actual measurement result, and a broken line indicates a result of a simulation in which a value of the coefficient G determined by the mathematical expression 9 is applied to the above-mentioned equivalent circuit. As shown in this figure, according to the equivalent circuits of the present invention, frequency characteristics of diverse coil elements can also be accurately reproduced. The mathematical expression 9 is used as one example. As long as the simulation result indicated by the broken line can be made to approximate to the actual measurement result indicated by the solid line, any mathematical expression can be used.

Example 4

Figure 5A:
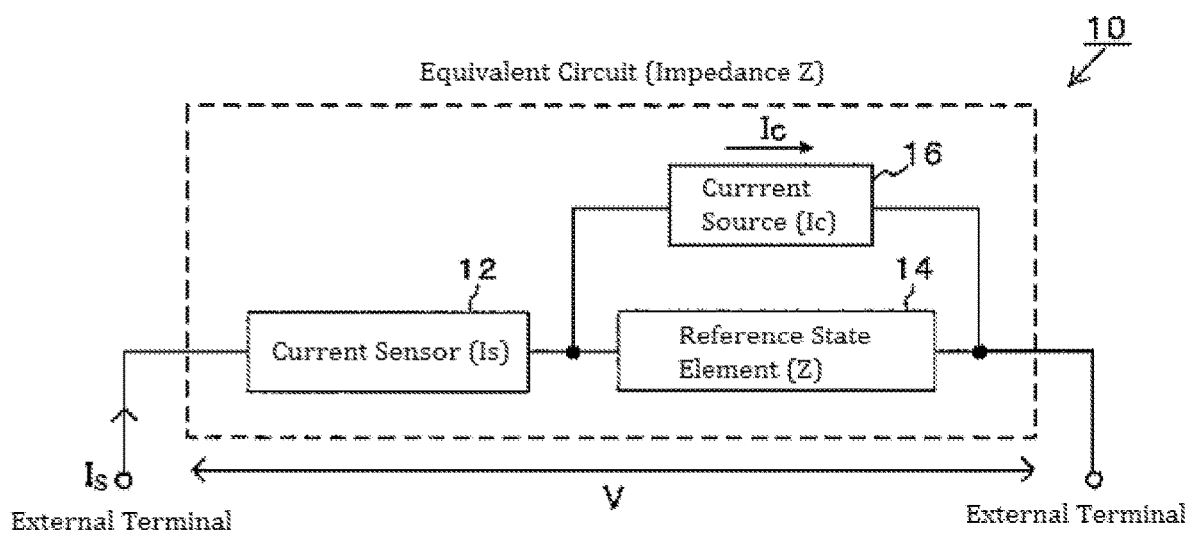
FIG. 5A shows Example 4 according to the present invention and is a block diagram showing a basic configuration of an equivalent circuit.

Next, with reference to FIGS. 5A to 5D, a description is given of Example 4 according to the present invention. This working example shows an example in which an equivalent circuit regarding an impedance is expressed by using a current sensor and a current source. As shown in FIG. 5A, an equivalent circuit 10 of this working example has a configuration in which a current sensor 12 and a reference state element 14 are connected in series, and a current source 16 is connected in parallel to the reference state element 14.

The current sensor 12 has detected a current Is flowing between external terminals of the equivalent circuit 10, and the detected current Is is fed back to the current source 16. Then, by the current source 16, a current Ic dependent on the current Is is caused to flow. A relationship between a voltage V and a current I between the external terminals of the equivalent circuit 10 is expressed by a mathematical expression 10 below, where an impedance of the reference state element 14 is denoted as Z. The current sensor 12 is formed of a voltage source, and a voltage across the current sensor 12 is set to 0[V].

$$I = \frac{V}{Z} + Ic(Is) \qquad \text{[Mathematial Expression 10]}$$

When the mathematical expression 10 is converted into an expression representing the impedance Z of the reference state element 14, a mathematical expression 11 below is obtained.

$$Z = \frac{V}{I - Ic(Is)} \qquad \text{[Mathematial Expression 11]}$$

Based on the mathematical expression 11, the impedance Z of the reference state element 14 changes depending on the current Ic of the current source 16 (an addition to or a subtraction from Ic). Accordingly, by setting the current Ic of the current source 16 to be a function dependent on the current Is detected by the current sensor 12, it becomes possible to reproduce a current superposition characteristic of the equivalent circuit 10 as a whole.

Figure 5B:
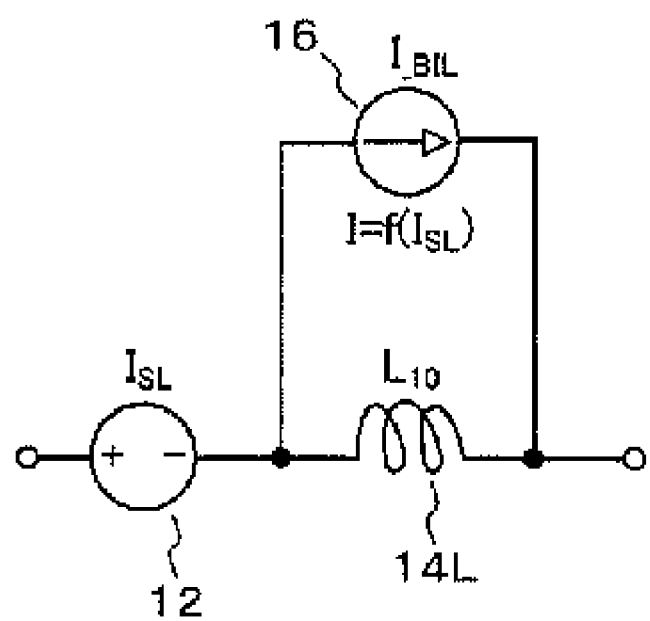
FIG. 5B shows Example 4 according to the present invention and is a circuit diagram showing an application example.
Figure 5C:
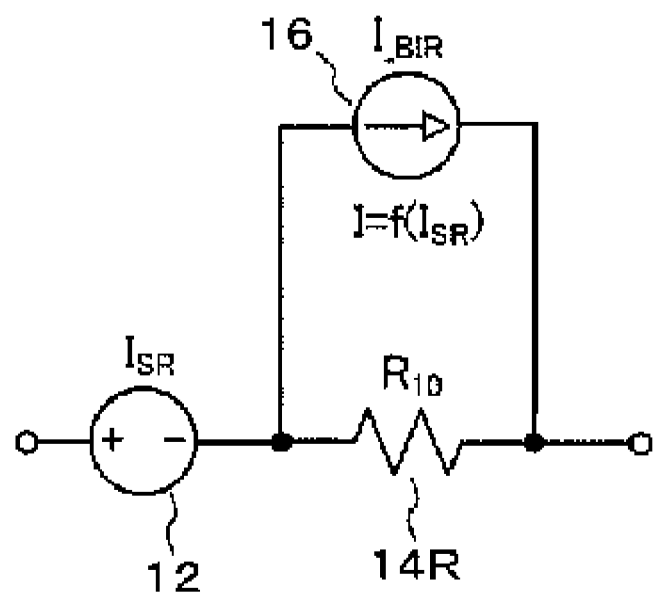
FIG. 5C shows Example 4 according to the present invention and is a circuit diagram showing an application example.
Figure 5D:
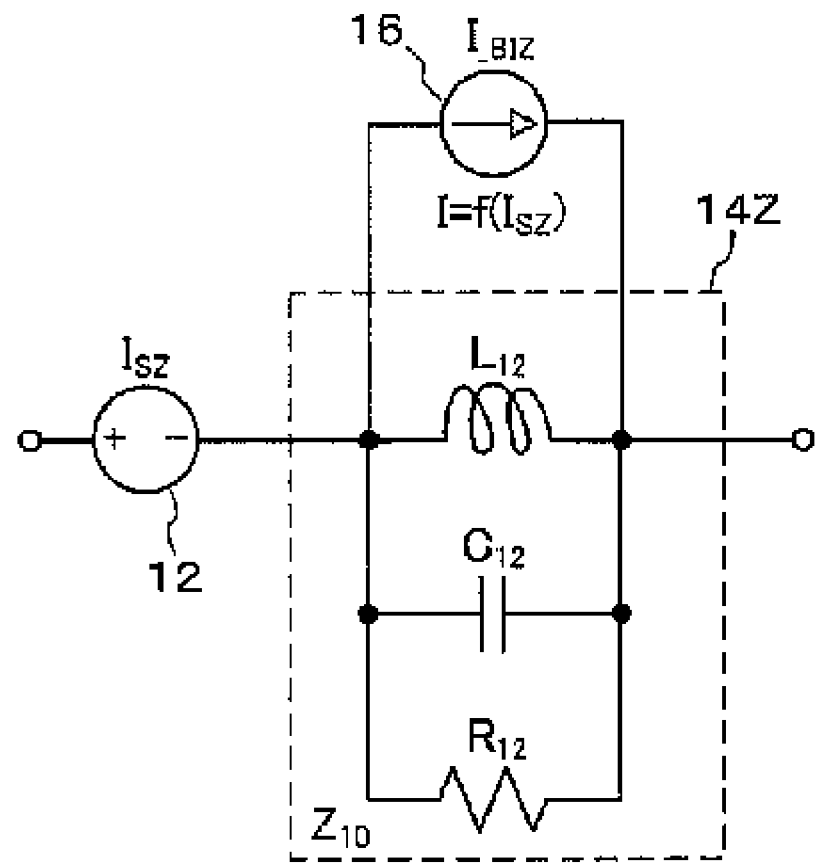
FIG. 5D shows Example 4 according to the present invention and is a circuit diagram showing an application example.

FIGS. 5B to 5D show specific equivalent circuit models for use in an actual circuit simulator. Among these models, the one in FIG. 5B is an example of a case where a reference state coil element 14L is used as the reference state element 14. Where an inductance of the reference state coil element 14L is denoted as L10 and a current of the current source 16 is denoted as I_BIL, a relationship between a voltage V and a current I of an equivalent circuit as a whole is expressed by a mathematical expression 12. It is understood from this mathematical expression that when the current source 16 is connected in parallel to the reference state coil element 14L, the equivalent circuit as a whole turns into a variable coil element dependent on the current I_BIL of the current source 16. Accordingly, by imparting a relationship dependent on the current ISL detected by the current sensor 12 to the current I_BIL of the current source 16, a current dependency of a coil element at a time of current superposition can be reproduced.

$$V = (I - I\_BIL) \times j\omega L_{10} \qquad \text{[Mathematical Expression 12]}$$

$$j\omega L_{10} = \frac{V}{(I - I\_BIL)}$$

FIG. 5C shows an example of a case where a reference state resistance element 14R is used as the reference state element 14. Where a resistance value of the reference state resistance element 14R is denoted as R10 and a current of the current source 16 is denoted as I_BIR, a relationship between a voltage V and a current I of an equivalent circuit as a whole is expressed by a mathematical expression 13. It is understood from this mathematical expression that when the current source 16 is connected in parallel to the reference state resistance element 14R, the equivalent circuit as a whole turns into a variable resistance element dependent on the current I_BIR of the current source 16. Accordingly, by imparting a relationship dependent on a current ISR detected by the current sensor 12 to the current I_BIR of the current source 16, a current dependency of a resistance element at a time of current superposition can be reproduced.

$$V = (I - I\_BIR) \times R_{10} \qquad \text{[Mathematical Expression 13]}$$

$$R_{10} = \frac{V}{(I - I\_BIR)}$$

FIG. 5D shows an example of a case where a reference state impedance element 14Z is used as the reference state element 14. While the reference state impedance element 14Z in the example shown in the figure has a configuration in which a reference state resistance element having a resistance value R12, a reference state coil element having an inductance L12, a reference state capacitor element having a capacitance C12 are connected in parallel to each other, various configurations may be adopted. Where an impedance of the reference state impedance element 14Z is denoted as Z10 and a current of the current source 16 is denoted as I_BIZ, a relationship between a voltage V and a current I of an equivalent circuit as a whole is expressed by a mathematical expression 14. It is understood from this mathematical expression that when the current source 16 is connected in parallel to the reference state impedance element 14Z, the equivalent circuit as a whole turns into a variable impedance element dependent on the current I_BIZ of the current source 16. Accordingly, by imparting a relationship dependent on a current ISZ detected by the current sensor 12 to the current I_BIZ of the current source 16, a current dependency of an impedance element at a time of current superposition can be reproduced.

$$V = (I - I\_BIZ) \times Z_{10} \qquad \text{[Mathematical Expression 14]}$$

$$Z_{10} = \frac{V}{(I - I\_BIZ)}$$

As described above, according to this working example, with respect to a reference state equivalent circuit representing a passive element in a reference state, a current source is connected in parallel thereto, and a current value of the current source is set to be dependent on a current value detected by a current sensor connected in series to the passive element, so that there can be obtained effects similar to those of the above-described working examples, such as the following: reproducibility in performing a simulation regarding a circuit characteristic is improved.

Example 5

Figure 6:
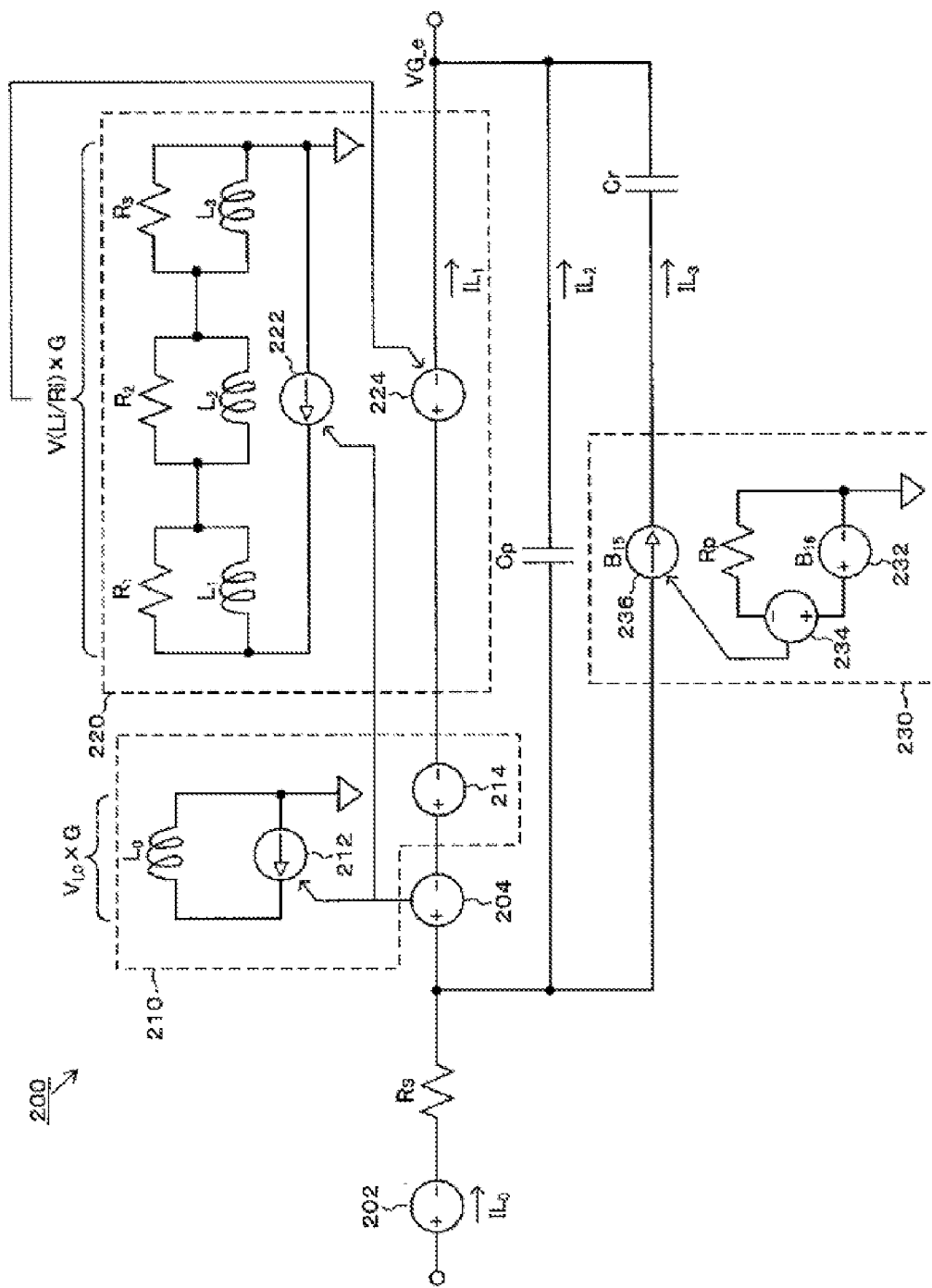
FIG. 6 is a circuit diagram showing Example 5 in which Examples 1 and 2 described above are applied to an equivalent circuit in a direct current component reference state according to the background art.

Next, with reference to FIG. 6, FIGS. 7A to 7D, FIG. 8 and FIG. 9, a description is given of Example 5. A working example shown in FIG. 6 is an example in which the equivalent circuit models using a current source, a voltage source, and a coefficient shown in FIGS. 1A and 1B are applied to the reference state equivalent circuit shown in FIG. 12B. In an equivalent circuit 200 shown in FIG. 6, L0, a group of L1/R1, L2/R2, and L3/R3, and Rp are set to have individual current superposition characteristics as current superposition equivalent circuits 210, 220, and 230, respectively. L1/R1 represents a parallel circuit composed of an inductance L1 and a resistance R1 (L2/R2 and L3/R3 are also configured similarly). Among these, the current superposition equivalent circuit 210 has a configuration to which a voltage source model shown in FIG. 1A is applied and in which a current source 212 and a voltage source 214 are added to an inductance L0. The current superposition equivalent circuit 220 also has a configuration to which the voltage source model is similarly applied and that additionally includes a current source 222 and a voltage source 224. The current superposition equivalent circuit 230 has a configuration to which a current source model shown in FIG. 1B is applied and that additionally includes a voltage source 232, a current sensor 234, and a current source 236.

A current sensor 202 monitors a current IL0 used to impart a dependency with respect to the current IL0 to a coefficient G. Specifically, IL=IL0 is substituted into the mathematical expression 9. A current sensor 204 monitors a current IL1 so as to feed it back to the current sources 212 and 222 of respective loop circuits of the current superposition equivalent circuits 210 and 220. A terminal voltage VL0×G of the inductance L0 is fed back to the current source 214, and a voltage obtained by multiplying a sum of terminal voltages V(L1/R1), V(L2/R2), and V(L3/R3) of L1/R1, L2/R2, and L3/R3, respectively, by G is fed back to the voltage source 224.

The voltage source 232 is used to apply a voltage across the current source 236 into a loop. The current sensor 234 monitors a current IRp flowing through a resistance Rp and feeds IPp/G back to the current source 236. In a case where capacitors Cp and Cr each have a current dependency, similarly to the resistance Rp, the current source model or the voltage source model is connected thereto. Furthermore, regarding the current IL0, IL0=IL1+IL2+IL3 is established.

In FIG. 6, in consideration of a balance between a fitting property and reproducibility, three Li/Ri circuits are integrated into one current-dependent circuit, and the equivalent circuit 200 is divided into three circuits, which are the current superposition equivalent circuits 210, 220, and 230. By configuring passive elements L0, Li, Ri, and Rp so that they individually form current superposition equivalent circuits, it becomes possible to reproduce a more complicated current superposition characteristic. In this case, however, the degree of difficulty in achieving characteristic fitting increases, resulting in an increase in time required for an arithmetic operation.

Figure 7A:
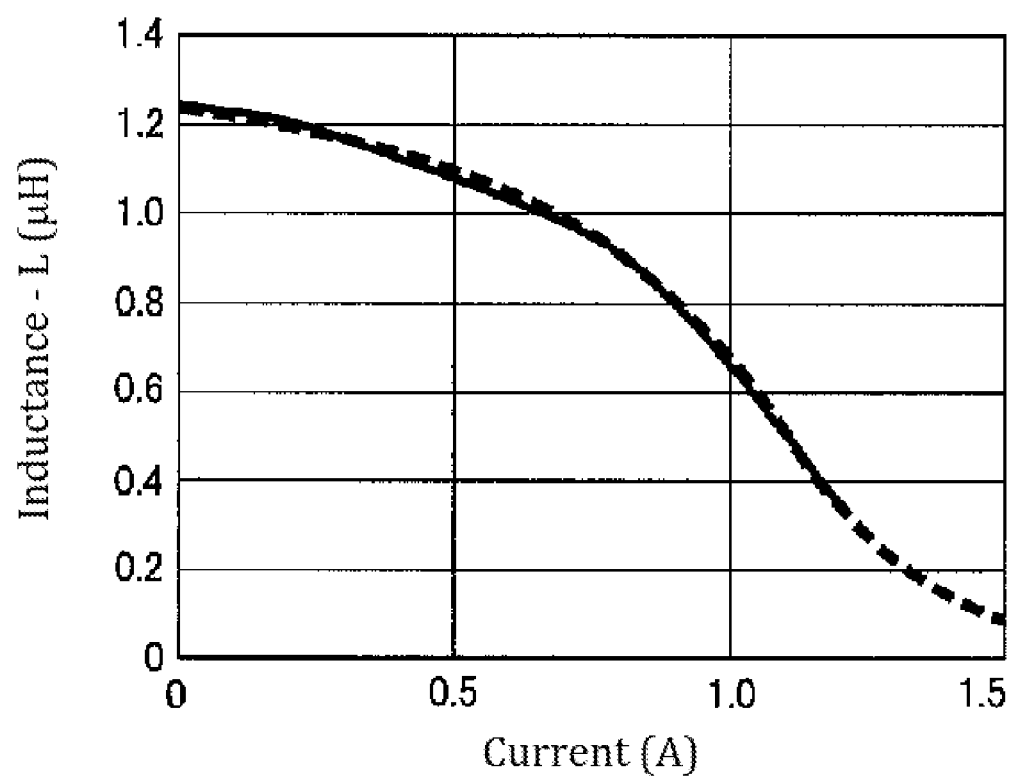
FIG. 7A is a graph showing a comparison between a result of performing a simulation regarding a direct current superposition characteristic of an inductor by using the equivalent circuit shown in FIG. 6 and an actual measurement value.
Figure 7B:
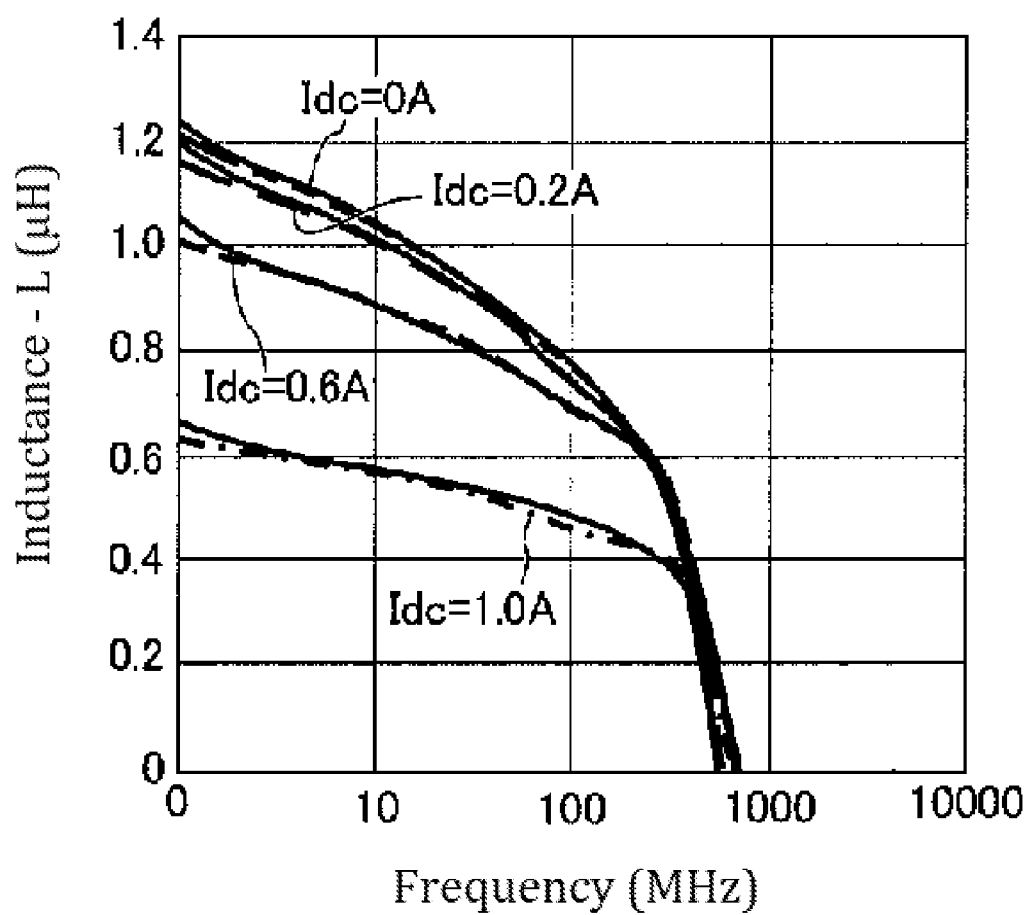
FIG. 7B is a graph showing a comparison between a result of performing a simulation regarding a direct current superposition characteristic of an inductor by using the equivalent circuit shown in FIG. 6 and an actual measurement value.
Figure 7C:
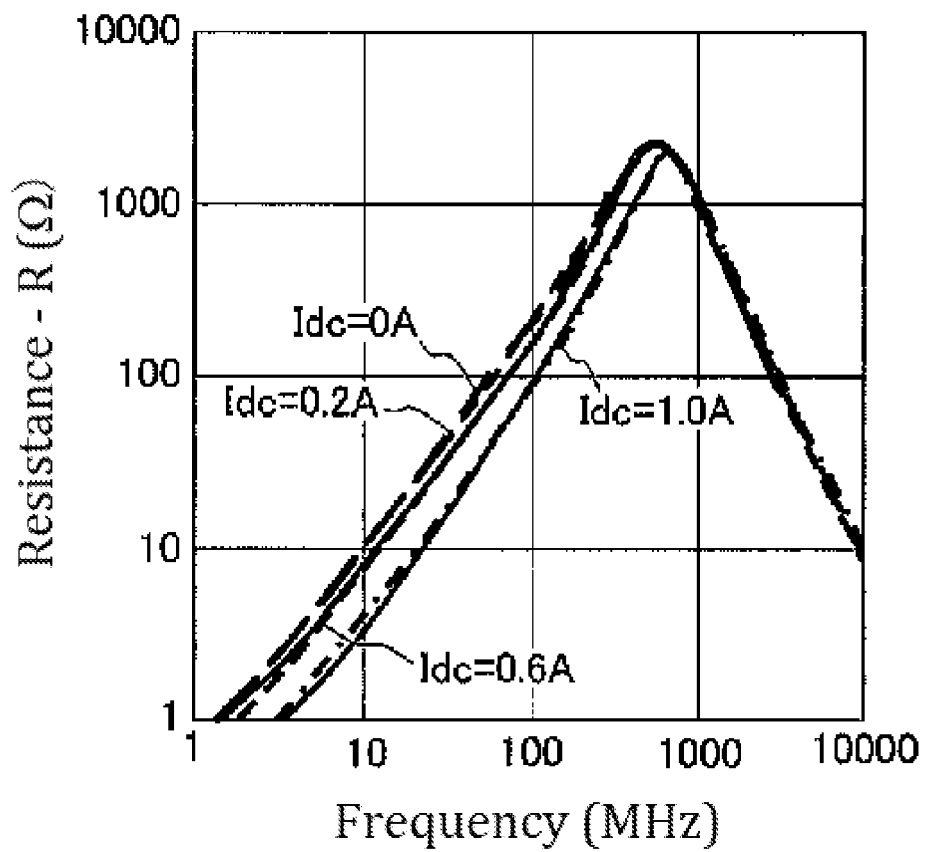
FIG. 7C is a graph showing a comparison between a result of performing a simulation regarding a direct current superposition characteristic of an inductor by using the equivalent circuit shown in FIG. 6 and an actual measurement value.
Figure 7D:
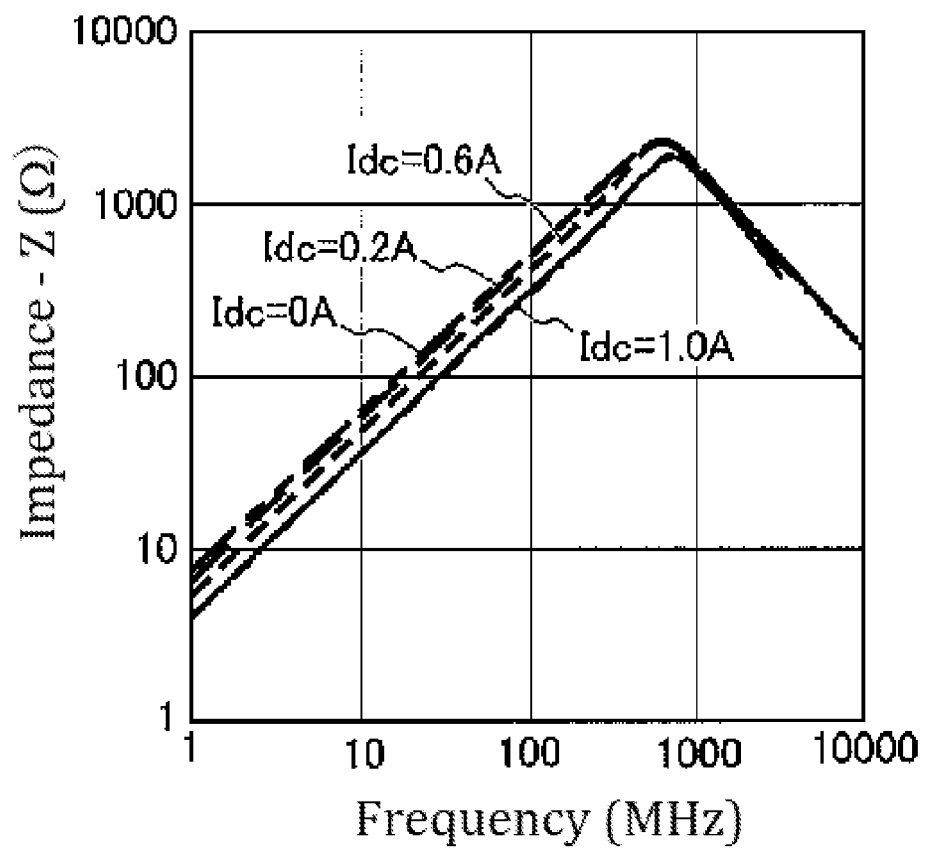
FIG. 7D is a graph showing a comparison between a result of performing a simulation regarding a direct current superposition characteristic of an inductor by using the equivalent circuit shown in FIG. 6 and an actual measurement value.

FIGS. 7A to 7D show a result of performing a simulation regarding a current superposition characteristic of an inductor by using the thus described equivalent circuit shown in FIG. 6. In these figures, a solid line indicates an actual measurement result, and a broken line indicates a simulation result. FIG. 7A shows a current superposition characteristic of an inductance at a particular frequency, and as shown therein, the actual measurement value and the simulation value accurately agree with each other. FIGS. 7B to 7D show frequency dependencies of an inductance L, a resistance R, and an impedance Z of a coil element at various superposition current values, respectively. Also in these figures, simulation results exhibit good reproducibility, with a decreased disparity between an actual measurement value and a simulation value.

Figure 8:
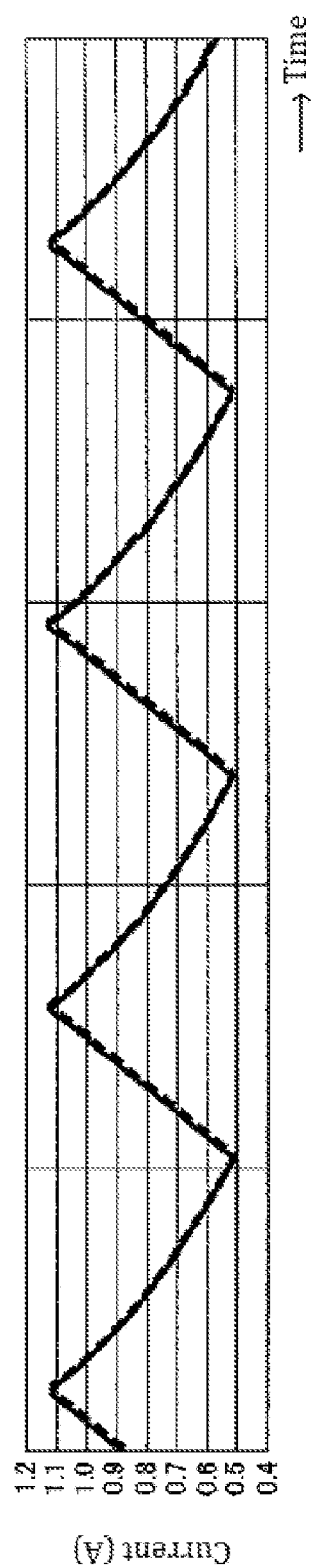
FIG. 8 is a graph showing a comparison between an actual measurement waveform and a simulation waveform with respect to an inductor current in a case where the equivalent circuit shown in FIG. 6 is applied to a DC-DC converter shown in FIG. 14A.
Figure 14A:
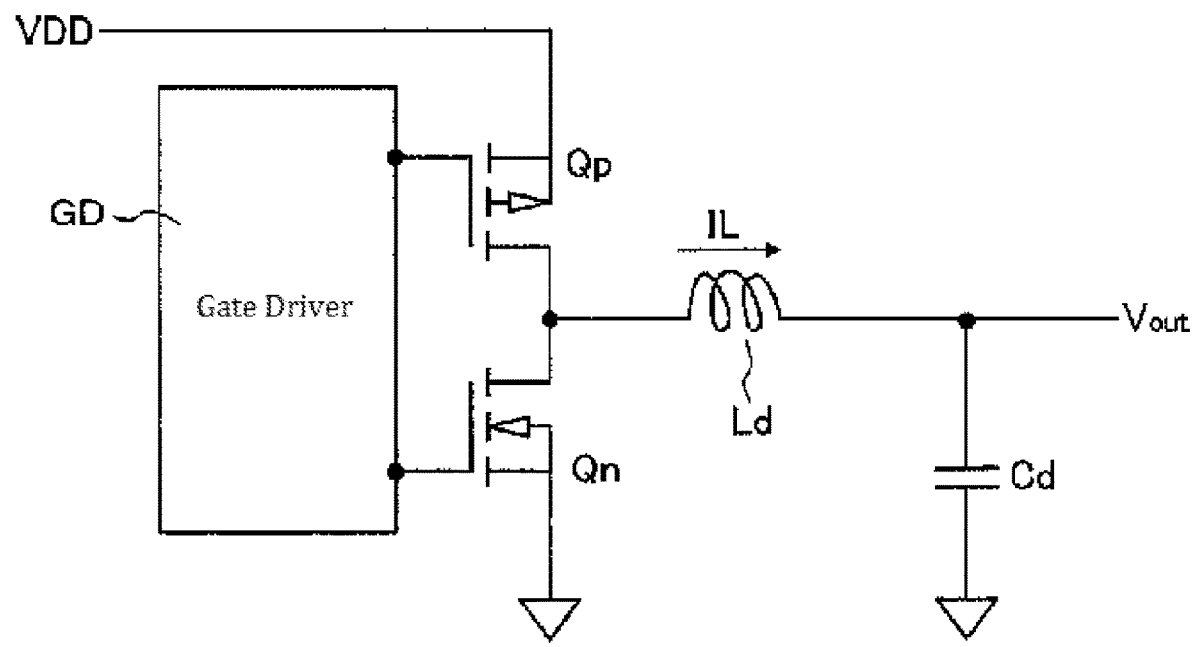
FIG. 14A shows a circuit example of the DC-DC converter.
Figure 14B:
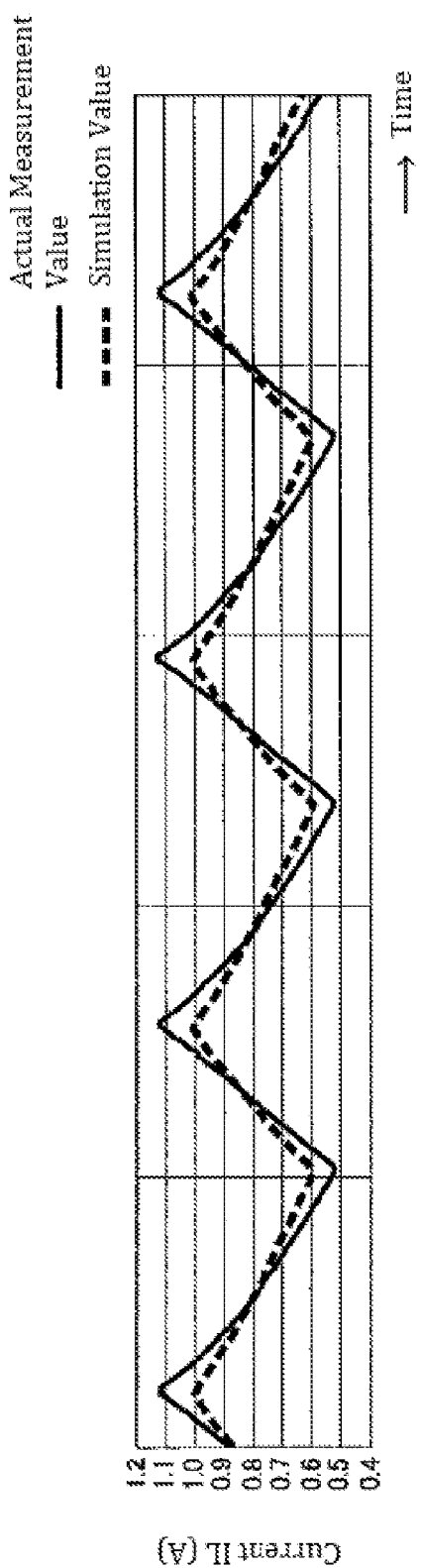
FIG. 14B is a graph showing a comparison between an actual measurement waveform and a simulation waveform with respect to a change in current in a case where the equivalent circuit shown in FIG. 12B is applied to FIG. 14A.

FIG. 8 shows a comparison between an actual measurement waveform and a simulation waveform with respect to an inductor current in a case where the equivalent circuit shown in FIG. 6 is applied to the DC-DC converter shown in FIG. 14A. A solid line indicates an actual measurement result, and a broken line indicates a simulation result. As is apparent from a comparison with the graph of FIG. 14B, the actual measurement result and the simulation result agree well with each other, and thus it can be confirmed that the present invention has extremely high characteristic reproducibility with respect to an actual circuit.

Figure 9:
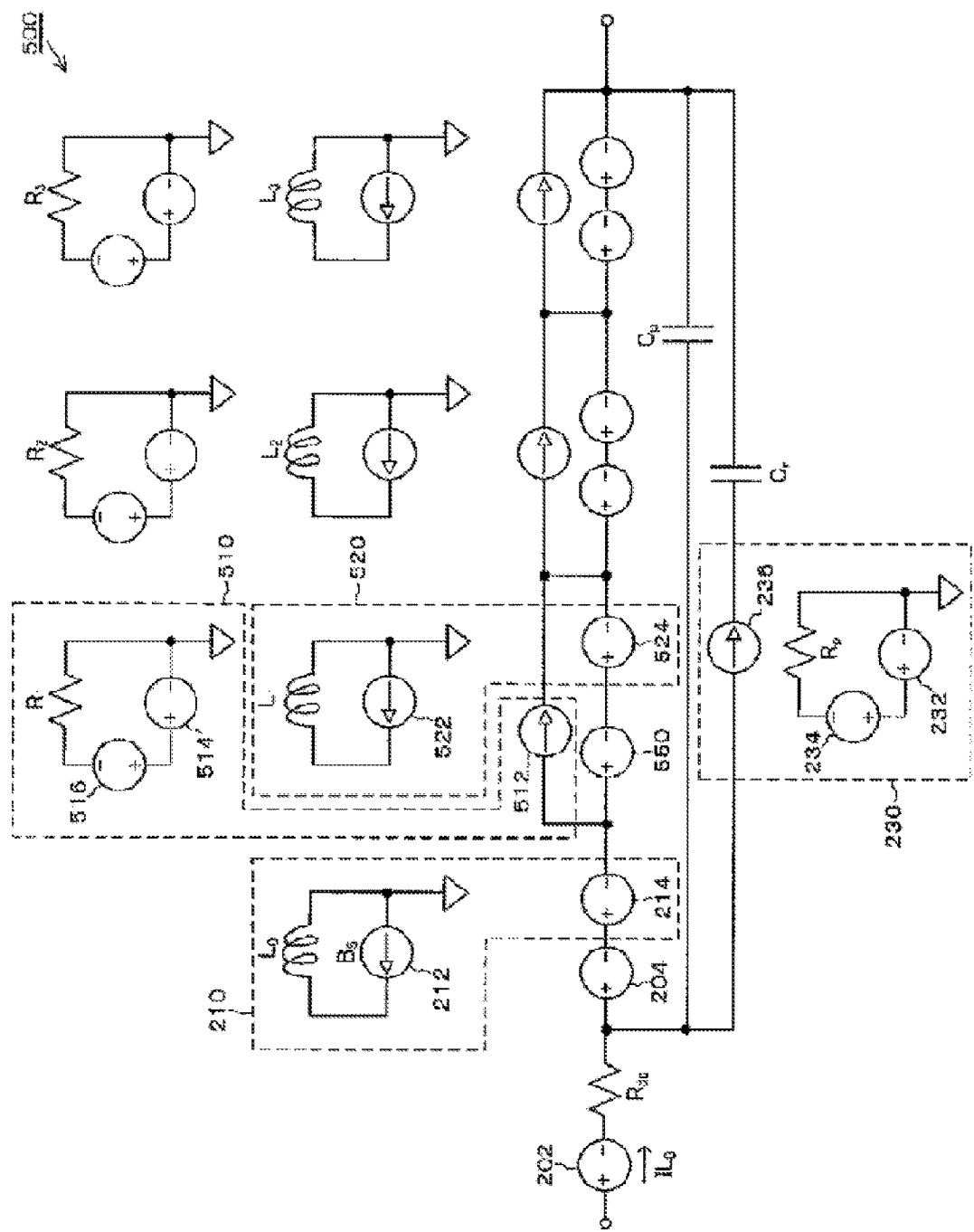
FIG. 9 is a circuit diagram showing another example of Example 5.

FIG. 9 shows an example of an equivalent circuit model in which Li/Ri circuits have individual current dependencies, respectively. In an equivalent circuit 500, a current source equivalent circuit 510 is adopted for a reference state resistance R1, and a voltage of a current source 512 is applied to a closed loop circuit including the reference state resistance R1 by a voltage source 514. Furthermore, a current flowing through the reference state resistance R1 is monitored by a current sensor 516, and a current obtained by multiplying this current by a coefficient 1/G is outputted by the current source 512. On the other hand, an equivalent circuit 520 that is the voltage source model shown in FIG. 1A is adopted for an inductance L1. A current monitored by a current sensor 550 is reproduced by a current source 522 and then is passed through a reference state coil element L1. Then, a terminal voltage of the reference state coil element L1 is multiplied by G, and a voltage thus obtained is outputted by a voltage source 524. A similar description applies also to each of reference state resistances R2 and R3 and reference state coil elements L2 and L3. As for current superposition equivalent circuits 210 and 230, a similar description to that of the configuration shown in FIG. 6 applies thereto.

Example 6

Figure 10:
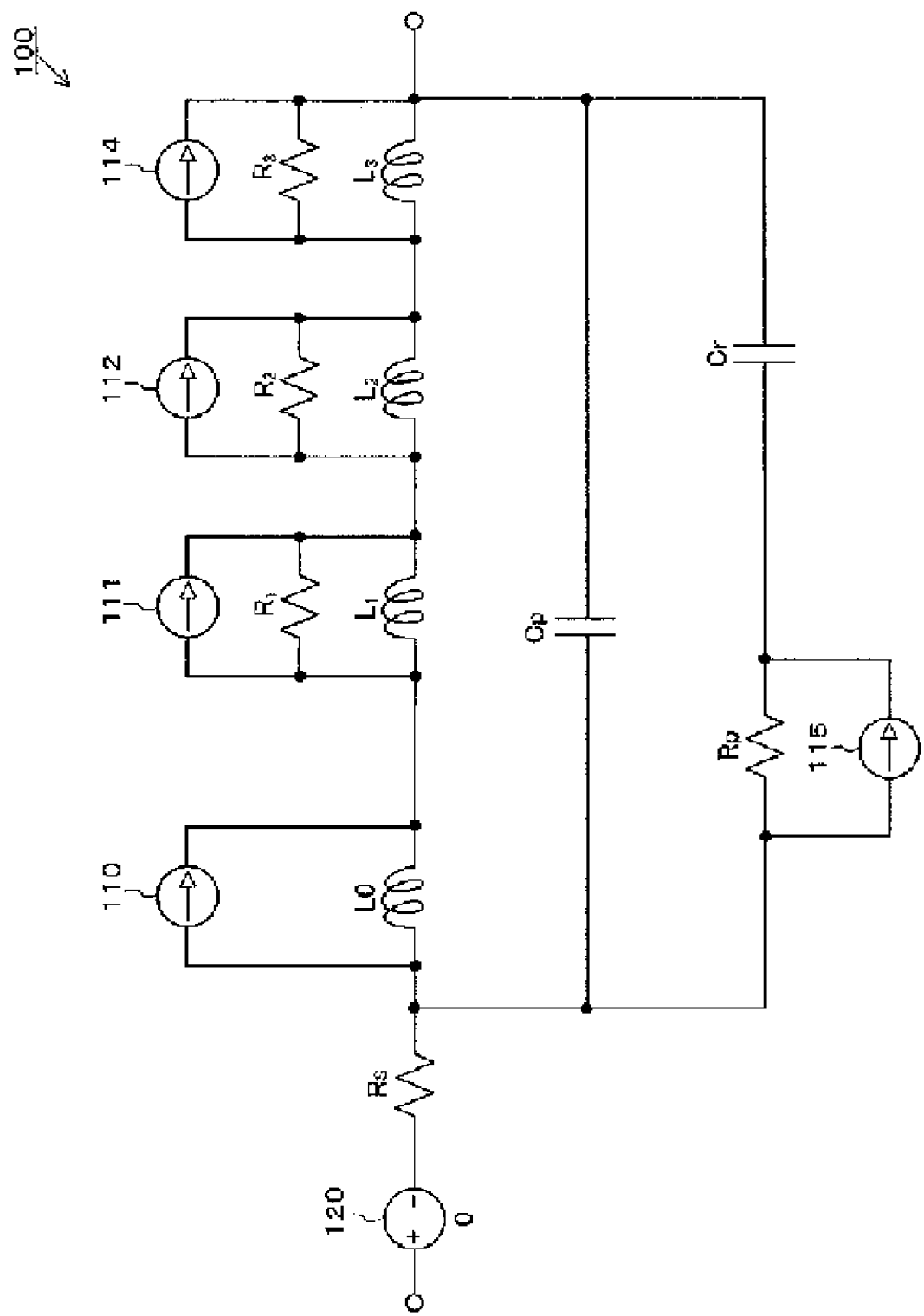
FIG. 10 is a circuit diagram showing a circuit example in which Example 4 described above is applied to an equivalent circuit in a reference state according to the background art.

Next, with reference to FIG. 10, a description is given of Example 6. This working example is an example in which an equivalent circuit model shown in FIG. 5A, which is based on a difference method using a current source, is applied to the coil element equivalent circuit according to the background art shown in FIG. 12B. FIG. 10 shows an equivalent circuit 100 in which current sources 110 to 115 each having a current superposition current dependency are connected in parallel to L0, L1/R1, L2/R2, L3/R3, and Rp, respectively. A current sensor 120 is connected to a resistance Rs. Also as for capacitors Cp and Cr, in a case where they each have a current dependency, similarly to the resistance Rp, a current source is connected thereto.

Example 7

Next, as Example 7, a simulation device will be described. The above-mentioned equivalent circuits shown in FIGS. 1A and 1B and FIG. 5A are described, for example, in a format of a SPICE model conforming to a SPICE simulator (LTspice, Pspice, etc.) that is a representative simulator and simulated on the simulator by using the SPICE model. Furthermore, information on a constant of an equivalent circuit and a constant change rate of a circuit element is described in standalone software or software for the Web, and a calculation method according to the present invention is applied thereto on the software. The information is then used for presentation of graphs or data of various characteristics of any current of a subject circuit element, a search for a circuit element satisfying a designated characteristic under any current condition, a calculation of a circuit characteristic in a case where the equivalent circuit is applied to a simple circuit, or the like.

Figure 11:
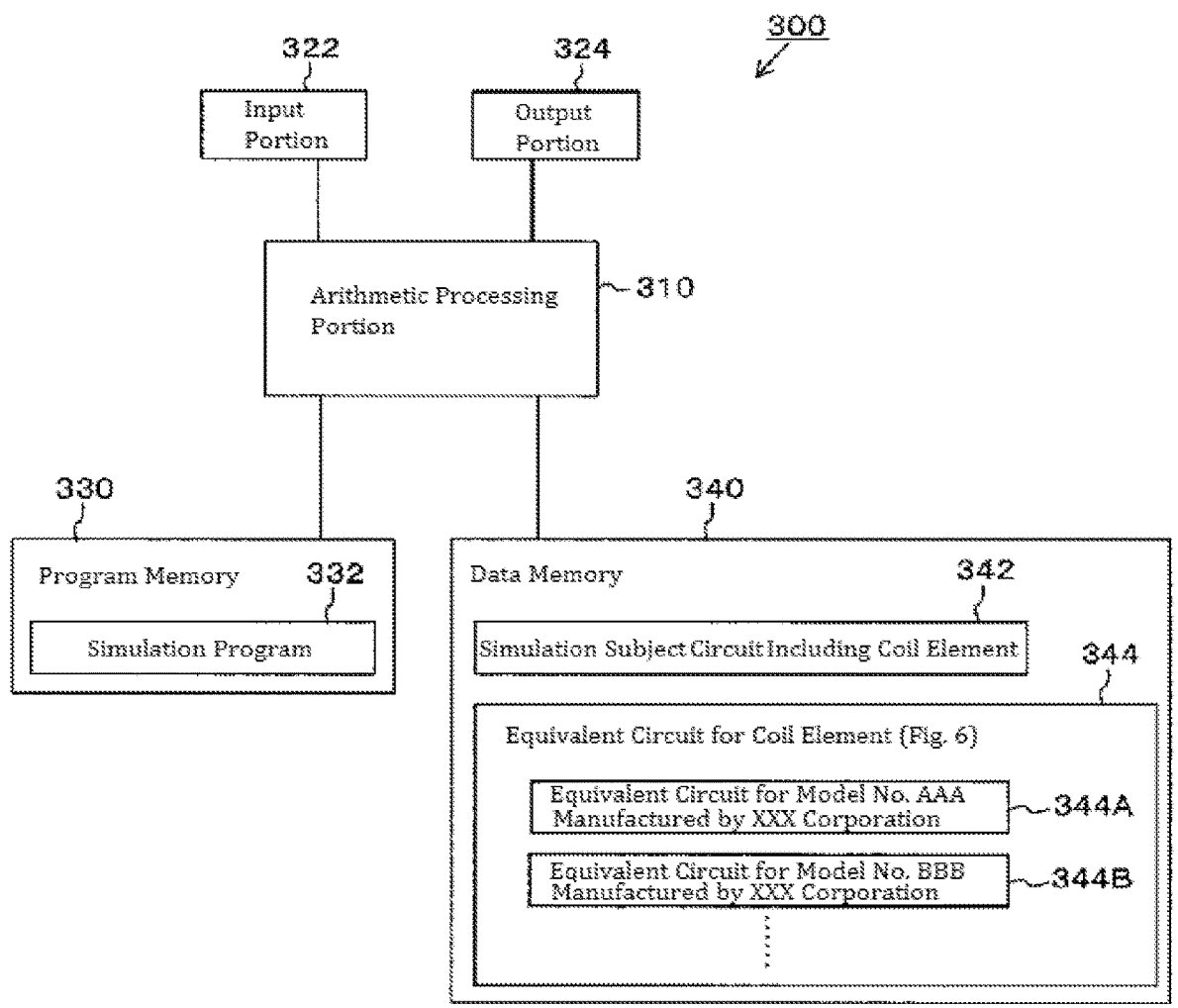
FIG. 11 is a block diagram showing a simulation device according to the present invention as Example 7.

FIG. 11 shows a configuration of a simulation device of this working example. A simulation device 300 is formed of a general computer system and has a configuration in which an input portion 322 such as a keyboard, an output portion 324 such as a liquid display, a program memory 330, and a data memory 340 are connected to an arithmetic processing portion 310 composed mainly of a CPU. A simulation program 332 (for example, a SPICE simulator) is stored in the program memory 330. A simulation subject circuit 342 including a passive element such as a coil and an equivalent circuit 344 as shown in FIGS. 1A and 1B and FIG. 5A are stored in the data memory 340.

The simulation subject circuit 342 is, for example, a circuit in which a current is applied so as to be superposed on a minute current or a voltage is applied so as to be superposed on a minute voltage, such as, for example, the DC-DC converter shown in FIG. 14A. The equivalent circuit 344 is prepared for each passive element. For example, an equivalent circuit 344A for a coil element having model No. AAA and manufactured by an XX corporation, an equivalent circuit 344B for a coil element having model No. BBB and manufactured by the XX corporation, and so on are prepared. When a SPICE simulator is used as the simulation program 332, the equivalent circuit 344 is provided in the form of a SPICE file.

When an instruction is given as to which passive element, i.e., a passive element having which model number and manufactured by which manufacturer, should be used as the passive element included in the simulation subject circuit 342, one of the equivalent circuits 344 corresponding to the passive element thus designated by the instruction is read from the data memory 340 and connected at a position of the passive element in the simulation subject circuit 342 as shown in FIGS. 2A to 2C, FIGS. 3A to 3C, FIG. 5B, FIG. 6, FIG. 9, or FIG. 10. Then, based on that circuit, the simulation program 332 of the program memory 330 is executed in the arithmetic processing portion 310, and thus a desired simulation is performed. By using the equivalent circuits at a time of superposition application shown in FIGS. 1A and 1B and FIG. 5A, a highly accurate simulation can be performed.

The present invention is not limited to the above-mentioned working examples, and various modifications can be made thereto without departing from the spirit of the present invention. For example, the present invention also embraces the following. (1) The equivalent circuit configurations described in the foregoing working examples are each one example, and the present invention is applicable to equivalent circuits having various configurations. (2) While in the foregoing working examples, a current flowing through a reference state equivalent circuit or a voltage between terminals thereof is multiplied by G or 1/G, various arithmetic operations such as an addition or a subtraction may be performed as required (3) While in a preferred example of the present invention, a direct current or a direct voltage is applied in a superposed manner to a reference state equivalent circuit, the present invention is applicable also to a case where a current other than a direct current or a voltage other than a direct voltage is applied thereto. (4) While a coil element, in particular, is a typical application example of the present invention, the present invention is applicable to equivalent circuits for various types of passive elements. (5) In a case where a plurality of reference state elements are included in an electronic circuit as a simulation subject, it can be decided as appropriate which one among the voltage source model shown in FIG. 1A, the current source model shown in FIG. 1B, and the difference method model shown in FIG. 5A should be applied. For example, a model of a common type may be applied to all the reference state elements or models of different types may be applied thereto.

INDUSTRIAL APPLICABILITY

According to the present invention, based on an equivalent circuit whose current or voltage is in a reference state, a power source circuit that exhibits a change in characteristic at a time of current or voltage superposition is added to the equivalent circuit. Thus, a passive element at a time of current or voltage superposition can be expressed by using a simply configured equivalent circuit, and it becomes possible to accurately express a characteristic at a time of current or voltage superposition. Thus, the present invention is suitable for designing various types of circuits each using a passive element to which a current or a voltage is superposed.

What is claimed is:

1. A method for constructing a superposition equivalent circuit for a passive element in a superposition state where a current or a voltage is superposed, the superposition equivalent circuit being constructed by utilizing a reference state equivalent circuit for the passive element in a reference state where the current or voltage is not superposed, the method comprising a step of:
    performing a correction by supplying a current or a voltage corresponding to a difference between a non-superposition characteristic of the passive element in the reference state and a superposition characteristic of the passive element in the superposition state, and outputting a result of the correction by replacing the result with a current source or a voltage source, wherein:
    the voltage source and a current sensor are connected between external terminals of the superposition equivalent circuit;
    the reference state equivalent circuit, the current source, and a voltage sensor are connected to an independent closed loop circuit not connected between the external terminals of the superposition equivalent circuit; and
    the step of performing the correction includes:
        detecting a current between the external terminals by use of the current sensor,
        passing a current dependent on a result of the detection from the current source through the reference state equivalent circuit,
        detecting a voltage generated in the reference state equivalent circuit by passing the current by use of the voltage sensor, and
        outputting a voltage dependent on a result of the detection from the voltage source.

2. The method for constructing a superposition equivalent circuit according to claim 1, wherein:
    a first arithmetic operation is performed based on the result of detecting the current between the external terminals, and a current obtained by the first arithmetic operation is output from the current source to the reference state equivalent circuit;
    a second arithmetic operation is performed based on the result of detecting the voltage generated in the reference state equivalent circuit, and a voltage obtained by the second arithmetic operation is output from the voltage source to between the external terminals; and
    the correction of the difference between the characteristic of the superposition equivalent circuit and the characteristic of the reference state equivalent circuit is performed by at least one of the first and second arithmetic operations.

3. The method for constructing a superposition equivalent circuit according to claim 2, wherein the first or second arithmetic operation used to perform the correction of the difference in characteristic is a multiplication or a division.

4. A simulation method, comprising a step of:
    calculating a characteristic of an electronic circuit by utilizing a superposition equivalent circuit constructed by the construction method according to claim 1, the electronic circuit including a passive element represented by said superposition equivalent circuit.

5. A simulation device, comprising:
    a superposition equivalent circuit constructed by the method according to claim 1,
    wherein the superposition equivalent circuit is connected in place of a passive element included in a circuit to be simulated, and an arithmetic operation for determining a characteristic of the circuit to be simulated is performed.

6. A method for constructing a superposition equivalent circuit for a passive element in a superposition state where a current or a voltage is superposed, the superposition equivalent circuit being constructed by utilizing a reference state equivalent circuit for the passive element in a reference state where the current or voltage is not superposed, the method comprising a step of:
    performing a correction by supplying a current or a voltage corresponding to a difference between a non-superposition characteristic of the passive element in the reference state and a superposition characteristic of the passive element in the superposition state, and outputting a result of the correction by replacing the result with a current source or a voltage source, wherein:
    the current source and a voltage sensor are connected between external terminals of the superposition equivalent circuit;
    the reference state equivalent circuit, the voltage source, and a current sensor are connected to an independent closed loop circuit not connected between the external terminals of the superposition equivalent circuit; and
    the step of performing the correction includes:
        detecting a voltage between the external terminals by use of the voltage sensor,
        passing a voltage dependent on a result of the detection from the voltage source through the reference state equivalent circuit,
        detecting a current generated in the reference state equivalent circuit by passing the voltage by use of the current sensor, and outputting a current dependent on a result of the detection from the current source.

7. The method for constructing a superposition equivalent circuit according to claim 6, wherein:
- a third arithmetic operation is performed based on the result of detecting the voltage between the external terminals, and a voltage obtained by the third arithmetic operation is output from the voltage source to the reference state equivalent circuit;
- a fourth arithmetic operation is performed based on the result of detecting the current generated in the reference state equivalent circuit, and a current obtained by the fourth arithmetic operation is output from the current source to between the external terminals; and
- the correction of the difference between the characteristic of the superposition equivalent circuit and the characteristic of the reference state equivalent circuit is performed by at least one of the third and fourth arithmetic operations.

8. The method for constructing a superposition equivalent circuit according to claim 7, wherein the third or fourth arithmetic operation used to perform the correction of the difference in characteristic is a multiplication or a division.

* * * * *